US008756142B1

(12) United States Patent
Keiser et al.

(10) Patent No.: US 8,756,142 B1
(45) Date of Patent: *Jun. 17, 2014

(54) COMPUTER-IMPLEMENTED SECURITIES TRADING SYSTEM

(75) Inventors: Timothy M. Keiser, Los Angeles, CA (US); Michael R. Burns, Los Angeles, CA (US)

(73) Assignee: CFPH, LLC, New York, NY (US)

( * ) Notice: Subject to any disclaimer, the term of this patent is extended or adjusted under 35 U.S.C. 154(b) by 1826 days.

This patent is subject to a terminal disclaimer.

(21) Appl. No.: 09/465,607

(22) Filed: Dec. 17, 1999

Related U.S. Application Data

(63) Continuation of application No. 09/184,571, filed on Nov. 2, 1998, now Pat. No. 6,505,174, which is a continuation-in-part of application No. 08/620,906, filed on Mar. 25, 1996, now Pat. No. 5,950,176.

(51) Int. Cl.
*G06Q 40/00* (2012.01)
(52) U.S. Cl.
USPC .......................................................... 705/37
(58) Field of Classification Search
USPC .......... 705/1, 35–38, 36 R; 707/10, 100–106; 463/25
See application file for complete search history.

(56) References Cited

U.S. PATENT DOCUMENTS

| | | |
|---|---|---|
| 3,499,646 A | 3/1970 | Burgess, Jr. et al. .............. 273/1 |
| 3,573,747 A | 4/1971 | Adams et al. .............. 340/172.5 |
| 3,581,072 A | 5/1971 | Nymeyer |
| 4,031,376 A | 6/1977 | Corkin, Jr. |
| 4,363,489 A | 12/1982 | Chodak et al. |
| 4,378,942 A | 4/1983 | Isaac |
| 4,412,287 A | 10/1983 | Braddock, III |
| 4,597,046 A | 6/1986 | Musmanno et al. .......... 364/408 |
| 4,674,044 A | 6/1987 | Kalmus et al. |
| 4,823,265 A | 4/1989 | Nelson |
| 4,874,177 A | 10/1989 | Girardin |

(Continued)

FOREIGN PATENT DOCUMENTS

| | | |
|---|---|---|
| CN | 1417731 | 5/2003 |
| DE | 3539545 | 11/1985 |

(Continued)

OTHER PUBLICATIONS

Text of the New War Revenue Bill as Agreed Upon by the Conferees: . . . New York Times (1857-1922); Feb. 7, 1919; ProQuest Historical Newspapers: The New York Times (1851-2009) p. 8.*

(Continued)

*Primary Examiner* — Hani M Kazimi
*Assistant Examiner* — Clement B Graham
(74) *Attorney, Agent, or Firm* — Thomas D. Bradshaw

(57) ABSTRACT

A computer-implemented financial management system provides the trading of securities via a network using virtual currency. A server computer receives buy and sell orders for derivative financial instruments from a plurality of client computers. The server computer attempts to match the buy and sell orders and then generates a market price through the use of a virtual specialist program executed by the server computer. The virtual specialist program responds to an imbalance in the matching of the buy and sell orders. The virtual currency accumulated by HSX account holders as a result of successful trading may be converted to another currency, credited toward the cost of merchandise provided through a vendor's web site, etc.

47 Claims, 4 Drawing Sheets

(56) References Cited

U.S. PATENT DOCUMENTS

| | | | |
|---|---|---|---|
| 4,890,228 A | 12/1989 | Longfield | |
| 4,903,201 A | 2/1990 | Wagner | 364/408 |
| 4,918,603 A | 4/1990 | Hughes et al. | |
| 4,962,950 A | 10/1990 | Champion | |
| 4,980,826 A | 12/1990 | Wagner | 364/408 |
| 5,027,102 A | 6/1991 | Sweeny | |
| 5,077,665 A | 12/1991 | Silverman et al. | 364/408 |
| 5,101,353 A | 3/1992 | Lupien et al. | |
| 5,108,115 A | 4/1992 | Berman et al. | |
| 5,136,501 A | 8/1992 | Silverman et al. | |
| 5,193,057 A | 3/1993 | Longfield | |
| 5,202,827 A | 4/1993 | Sober | |
| 5,237,500 A | 8/1993 | Perg et al. | 364/408 |
| 5,270,922 A | 12/1993 | Higgins | 364/408 |
| 5,297,032 A | 3/1994 | Trojan et al. | 364/408 |
| 5,311,423 A | 5/1994 | Clark | |
| 5,315,634 A | 5/1994 | Tanaka et al. | |
| 5,375,055 A | 12/1994 | Togher et al. | 364/408 |
| 5,489,096 A | 2/1996 | Aron | |
| 5,497,317 A | 3/1996 | Hawkins et al. | |
| 5,508,731 A | 4/1996 | Kohorn | |
| 5,508,913 A | 4/1996 | Yamamoto et al. | 364/408 |
| 5,537,314 A | 7/1996 | Kanter | 364/406 |
| 5,557,517 A | 9/1996 | Daughterty, III | 364/408 |
| 5,573,244 A | 11/1996 | Mindes | |
| 5,586,937 A | 12/1996 | Menashe | |
| 5,689,652 A | 11/1997 | Lupien et al. | 395/237 |
| 5,692,233 A | 11/1997 | Garman | 705/36 |
| 5,713,793 A | 2/1998 | Holte | |
| 5,724,524 A * | 3/1998 | Hunt et al. | 705/37 |
| 5,727,165 A | 3/1998 | Ordish et al. | 395/237 |
| 5,743,525 A | 4/1998 | Haddad | |
| 5,794,219 A | 8/1998 | Brown | |
| 5,799,287 A | 8/1998 | Dembo | |
| 5,806,048 A | 9/1998 | Kiron et al. | |
| 5,819,237 A | 10/1998 | Garman | |
| 5,819,238 A | 10/1998 | Fernholz | |
| 5,826,241 A | 10/1998 | Stein et al. | 705/26 |
| 5,842,148 A | 11/1998 | Prendergast et al. | |
| 5,842,921 A | 12/1998 | Mindes et al. | |
| 5,845,266 A * | 12/1998 | Lupien et al. | 705/36 R |
| 5,846,132 A | 12/1998 | Junkin | |
| 5,888,136 A | 3/1999 | Herbert | |
| 5,905,974 A | 5/1999 | Fraser et al. | 705/37 |
| 5,913,203 A | 6/1999 | Wong et al. | 705/39 |
| 5,924,082 A | 7/1999 | Silverman et al. | 705/37 |
| 5,946,667 A | 8/1999 | Tull, Jr. et al. | |
| 5,950,176 A | 9/1999 | Keiser et al. | |
| 5,950,177 A | 9/1999 | Lupien et al. | |
| 5,957,775 A | 9/1999 | Cherry | |
| 5,963,921 A | 10/1999 | Longfield | |
| 5,970,479 A | 10/1999 | Shepherd | |
| 6,004,211 A | 12/1999 | Brenner et al. | |
| 6,009,402 A | 12/1999 | Whitworth | |
| 6,012,046 A | 1/2000 | Lupien et al. | |
| 6,014,643 A | 1/2000 | Minton | 705/37 |
| 6,016,483 A | 1/2000 | Rickard et al. | |
| 6,023,685 A | 2/2000 | Brett et al. | |
| 6,024,641 A | 2/2000 | Sarno | |
| 6,026,364 A | 2/2000 | Whitworth | |
| 6,026,388 A | 2/2000 | Liddy et al. | |
| 6,029,146 A | 2/2000 | Hawkins et al. | 705/35 |
| 6,035,287 A | 3/2000 | Stallaert et al. | |
| 6,058,377 A | 5/2000 | Traub et al. | |
| 6,058,379 A | 5/2000 | Odom et al. | |
| 6,064,985 A | 5/2000 | Anderson | |
| 6,067,532 A | 5/2000 | Gebb | |
| 6,088,685 A | 7/2000 | Kiron | |
| 6,112,189 A | 8/2000 | Rickard et al. | |
| 6,113,492 A | 9/2000 | Walker et al. | |
| 6,120,376 A | 9/2000 | Cherry | |
| 6,126,543 A | 10/2000 | Friedman | |
| 6,152,822 A | 11/2000 | Herbert | |
| 6,154,730 A | 11/2000 | Adams et al. | |
| 6,161,096 A | 12/2000 | Bell | |
| 6,202,052 B1 | 3/2001 | Miller | |
| 6,236,900 B1 | 5/2001 | Geiger | |
| 6,240,396 B1 | 5/2001 | Walker et al. | |
| 6,260,019 B1 | 7/2001 | Courts | |
| 6,260,024 B1 | 7/2001 | Shkedy | |
| 6,263,321 B1 * | 7/2001 | Daughtery, III | 705/36 |
| 6,278,981 B1 | 8/2001 | Dembo et al. | |
| 6,296,569 B1 | 10/2001 | Congello, Jr. | |
| 6,309,307 B1 | 10/2001 | Krause et al. | |
| 6,325,721 B1 | 12/2001 | Miyamoto et al. | |
| 6,331,148 B1 | 12/2001 | Krause et al. | |
| 6,347,086 B1 | 2/2002 | Strachan | |
| 6,358,150 B1 | 3/2002 | Mir et al. | |
| 6,360,210 B1 | 3/2002 | Wallman | |
| 6,371,855 B1 | 4/2002 | Gavriloff | |
| 6,418,417 B1 | 7/2002 | Corby et al. | |
| 6,443,841 B1 * | 9/2002 | Rossides | 463/25 |
| 6,450,887 B1 | 9/2002 | Mir et al. | |
| 6,470,324 B1 | 10/2002 | Brown et al. | |
| 6,482,091 B1 | 11/2002 | Kobayashi et al. | |
| 6,505,174 B1 | 1/2003 | Keiser et al. | |
| 6,527,270 B2 | 3/2003 | Maksymec et al. | |
| 6,578,010 B1 | 6/2003 | Teacherson | 705/14 |
| 6,598,028 B1 | 7/2003 | Sullivan et al. | |
| 6,669,565 B2 | 12/2003 | Liegey | |
| 6,688,978 B1 | 2/2004 | Herman | |
| 6,692,916 B2 | 2/2004 | Bevilacqua et al. | |
| 6,697,787 B1 | 2/2004 | Miller | |
| 6,711,550 B1 | 3/2004 | Lewis et al. | |
| 6,772,132 B1 | 8/2004 | Kemp et al. | |
| 6,792,411 B1 | 9/2004 | Massey, Jr. | |
| 6,837,791 B1 | 1/2005 | McNutt et al. | |
| 6,910,965 B2 | 6/2005 | Downes | |
| 6,925,446 B2 | 8/2005 | Watanabe | |
| 6,939,137 B1 | 9/2005 | Colaio et al. | |
| 7,001,279 B1 | 2/2006 | Barber et al. | |
| 7,003,485 B1 | 2/2006 | Young | |
| 7,006,991 B2 | 2/2006 | Keiser et al. | |
| 7,016,873 B1 | 3/2006 | Peterson et al. | |
| 7,031,938 B2 | 4/2006 | Fraivillig et al. | |
| 7,062,457 B1 | 6/2006 | Kaufman | |
| 7,076,459 B2 | 7/2006 | Zhang et al. | |
| 7,099,838 B1 | 8/2006 | Gastineau et al. | |
| 7,099,839 B2 | 8/2006 | Madoff et al. | |
| 7,110,961 B1 | 9/2006 | Goino | |
| 7,120,928 B2 | 10/2006 | Sheth et al. | |
| 7,124,106 B1 | 10/2006 | Stallaert et al. | |
| 7,127,425 B1 | 10/2006 | Wilson | |
| 7,131,574 B1 | 11/2006 | Sciupac et al. | |
| 7,146,334 B2 | 12/2006 | Hogg et al. | |
| 7,152,041 B2 | 12/2006 | Salavadori et al. | |
| 7,158,950 B2 | 1/2007 | Snyder | |
| 7,162,447 B1 | 1/2007 | Cushing | |
| 7,171,385 B1 | 1/2007 | Dembo et al. | |
| 7,171,386 B1 | 1/2007 | Raykhman | |
| 7,172,508 B2 | 2/2007 | Simon et al. | |
| 7,174,517 B2 | 2/2007 | Barnett et al. | |
| 7,177,829 B1 | 2/2007 | Wilson et al. | |
| 7,219,071 B2 | 5/2007 | Gallagher | |
| 7,233,922 B2 | 6/2007 | Asher et al. | |
| 7,236,955 B2 | 6/2007 | Sugahara | |
| 7,249,081 B2 | 7/2007 | Shearer et al. | |
| 7,263,504 B2 | 8/2007 | Galai et al. | |
| 7,321,871 B2 | 1/2008 | Scott et al. | |
| 7,340,425 B2 | 3/2008 | Boyle et al. | |
| 7,341,517 B2 | 3/2008 | Asher et al. | |
| 7,359,871 B2 | 4/2008 | Paasche et al. | |
| 7,389,262 B1 | 6/2008 | Lange | |
| 7,389,268 B1 | 6/2008 | Kemp et al. | |
| 7,395,232 B1 | 7/2008 | Pilato | |
| 7,409,367 B2 | 8/2008 | McGill et al. | |
| 7,437,304 B2 | 10/2008 | Barnard et al. | |
| 7,438,640 B2 | 10/2008 | Amour | |
| 7,451,104 B1 | 11/2008 | Hendrix | |
| 7,487,123 B1 | 2/2009 | Keiser et al. | |
| 7,567,931 B2 | 7/2009 | Asher et al. | |
| 7,567,935 B2 | 7/2009 | Tell et al. | |
| 7,571,130 B2 | 8/2009 | Weber et al. | |
| 7,641,549 B2 | 1/2010 | Asher et al. | |

(56) References Cited

U.S. PATENT DOCUMENTS

| | | |
|---|---|---|
| 7,690,991 B2 | 4/2010 | Black |
| 7,742,972 B2 | 6/2010 | Lange et al. |
| 7,818,225 B2 | 10/2010 | Gula |
| 7,844,514 B2 | 11/2010 | Blasnik et al. |
| 7,918,392 B2 | 4/2011 | Beck et al. |
| 7,962,400 B2 | 6/2011 | Amaitis et al. |
| 7,996,296 B2 | 8/2011 | Lange |
| 2001/0003099 A1 | 6/2001 | Von Kohorn |
| 2001/0029485 A1 | 10/2001 | Brody et al. |
| 2001/0031656 A1 | 10/2001 | Marshall et al. |
| 2001/0034268 A1 | 10/2001 | Thomas et al. |
| 2001/0037211 A1 | 11/2001 | McNutt et al. |
| 2001/0037268 A1 | 11/2001 | Miller |
| 2001/0039209 A1 | 11/2001 | DeWeese et al. |
| 2001/0042785 A1 | 11/2001 | Walker et al. |
| 2001/0047291 A1 | 11/2001 | Garahi et al. |
| 2001/0047295 A1 | 11/2001 | Tenembaum |
| 2002/0013747 A1 | 1/2002 | Valentine et al. |
| 2002/0019792 A1 | 2/2002 | Maerz et al. |
| 2002/0023035 A1 | 2/2002 | Kiron et al. |
| 2002/0023037 A1 | 2/2002 | White |
| 2002/0026390 A1 | 2/2002 | Ulenas et al. |
| 2002/0032641 A1 | 3/2002 | Mendiola et al. |
| 2002/0038270 A1 | 3/2002 | Shin et al. |
| 2002/0046109 A1 | 4/2002 | Leonard et al. |
| 2002/0055089 A1 | 5/2002 | Scheirer |
| 2002/0062243 A1 | 5/2002 | Anderson |
| 2002/0062281 A1 | 5/2002 | Singhal |
| 2002/0065666 A1 | 5/2002 | Zorrila De San Martin Soto |
| 2002/0068633 A1 | 6/2002 | Schlaifer |
| 2002/0073021 A1 | 6/2002 | Ginsberg et al. |
| 2002/0076674 A1 | 6/2002 | Kaplan |
| 2002/0077880 A1 | 6/2002 | Gordon et al. |
| 2002/0082965 A1 | 6/2002 | Loeper |
| 2002/0082969 A1 | 6/2002 | O'Keeffe et al. |
| 2002/0087447 A1 | 7/2002 | McDonald et al. |
| 2002/0094869 A1 | 7/2002 | Harkham |
| 2002/0095369 A1 | 7/2002 | Kaplan et al. |
| 2002/0099640 A1 | 7/2002 | Lange |
| 2002/0111946 A1 | 8/2002 | Fallon |
| 2002/0112014 A1 | 8/2002 | Bennett et al. |
| 2002/0115488 A1 | 8/2002 | Berry et al. |
| 2002/0119793 A1 | 8/2002 | Hronek et al. |
| 2002/0120490 A1 | 8/2002 | Gajewski et al. |
| 2002/0128951 A1 | 9/2002 | Kiron et al. |
| 2002/0133410 A1 | 9/2002 | Hermreck et al. |
| 2002/0143676 A1 | 10/2002 | Kiron et al. |
| 2002/0147670 A1 | 10/2002 | Lange |
| 2002/0152458 A1 | 10/2002 | Eyer et al. |
| 2002/0153656 A1 | 10/2002 | Maksymec et al. |
| 2002/0156709 A1 | 10/2002 | Andrus et al. |
| 2002/0156715 A1 | 10/2002 | Wall et al. |
| 2002/0161622 A1 | 10/2002 | Zhang et al. |
| 2002/0165740 A1 | 11/2002 | Saunder |
| 2002/0194097 A1 | 12/2002 | Reitz |
| 2002/0194502 A1 | 12/2002 | Sheth et al. |
| 2003/0008711 A1 | 1/2003 | Corbo |
| 2003/0009415 A1 | 1/2003 | Lutnick et al. |
| 2003/0018564 A1 | 1/2003 | Bonnier et al. |
| 2003/0018571 A1 | 1/2003 | Eckert et al. |
| 2003/0022719 A1 | 1/2003 | Donald et al. |
| 2003/0036395 A1 | 2/2003 | Proidi |
| 2003/0036396 A1 | 2/2003 | Back et al. |
| 2003/0061096 A1 | 3/2003 | Gallivan et al. |
| 2003/0065615 A1 | 4/2003 | Aschir |
| 2003/0093356 A1 | 5/2003 | Kaufman |
| 2003/0101128 A1 | 5/2003 | Abernethy |
| 2003/0115128 A1 | 6/2003 | Lange et al. |
| 2003/0130941 A1 | 7/2003 | Birle |
| 2003/0144054 A1 | 7/2003 | DeWeese et al. |
| 2003/0144057 A1 | 7/2003 | Brenner et al. |
| 2003/0154092 A1 | 8/2003 | Bouron et al. |
| 2003/0157976 A1 | 8/2003 | Simon et al. |
| 2003/0171980 A1 | 9/2003 | Keiser et al. |
| 2003/0172026 A1 | 9/2003 | Tarrant |
| 2003/0177055 A1 | 9/2003 | Zimmerman, Jr. et al. |
| 2003/0199315 A1 | 10/2003 | Downes |
| 2003/0200164 A1 | 10/2003 | Jacobs |
| 2003/0204408 A1 | 10/2003 | Guler et al. |
| 2003/0212623 A1 | 11/2003 | Aylmer et al. |
| 2003/0236734 A1 | 12/2003 | Guler et al. |
| 2003/0236738 A1 | 12/2003 | Lange et al. |
| 2004/0015427 A1 | 1/2004 | Camelio |
| 2004/0039685 A1 | 2/2004 | Hambrecht et al. |
| 2004/0049447 A1 | 3/2004 | Keiser et al. |
| 2004/0058731 A1 | 3/2004 | Rossides |
| 2004/0059646 A1 | 3/2004 | Harrington et al. |
| 2004/0059660 A1 | 3/2004 | Michael |
| 2004/0068738 A1 | 4/2004 | Kinoshita |
| 2004/0078268 A1 | 4/2004 | Sprogis |
| 2004/0078314 A1 | 4/2004 | Maerz et al. |
| 2004/0088242 A1 | 5/2004 | Asher et al. |
| 2004/0088244 A1 | 5/2004 | Bartter et al. |
| 2004/0110552 A1 | 6/2004 | Del Prado |
| 2004/0111358 A1 | 6/2004 | Lange et al. |
| 2004/0117302 A1 | 6/2004 | Weichert et al. |
| 2004/0138977 A1 | 7/2004 | Tomkins et al. |
| 2004/0143530 A1 | 7/2004 | Galai et al. |
| 2004/0148244 A1 | 7/2004 | Badeau et al. |
| 2004/0153375 A1 | 8/2004 | Mukunya et al. |
| 2004/0171381 A1 | 9/2004 | Inselberg |
| 2004/0192437 A1 | 9/2004 | Amaitis et al. |
| 2004/0193469 A1 | 9/2004 | Amaitis et al. |
| 2004/0193531 A1 | 9/2004 | Amaitis et al. |
| 2004/0199450 A1 | 10/2004 | Johnston et al. |
| 2004/0199459 A1 | 10/2004 | Johnston et al. |
| 2004/0199471 A1 | 10/2004 | Hardjono |
| 2004/0204245 A1 | 10/2004 | Amaitis et al. |
| 2004/0210507 A1 | 10/2004 | Asher et al. |
| 2004/0225554 A1 | 11/2004 | Chiappetta et al. |
| 2004/0229671 A1 | 11/2004 | Stronach et al. |
| 2004/0235542 A1 | 11/2004 | Stronach et al. |
| 2004/0235561 A1 | 11/2004 | Marshall et al. |
| 2004/0243504 A1 | 12/2004 | Asher et al. |
| 2004/0248637 A1 | 12/2004 | Liebenberg et al. |
| 2004/0260575 A1 | 12/2004 | Massey, Jr. |
| 2004/0267657 A1 | 12/2004 | Hecht |
| 2005/0010487 A1 | 1/2005 | Weisbach et al. |
| 2005/0021441 A1 | 1/2005 | Flake et al. |
| 2005/0021445 A1 | 1/2005 | Caro |
| 2005/0027583 A1 | 2/2005 | Smit et al. |
| 2005/0027643 A1 | 2/2005 | Amaitis et al. |
| 2005/0038706 A1 | 2/2005 | Yazdani et al. |
| 2005/0044025 A1 | 2/2005 | Tutty et al. |
| 2005/0049731 A1 | 3/2005 | Dell |
| 2005/0055302 A1 | 3/2005 | Wenger et al. |
| 2005/0064937 A1 | 3/2005 | Ballman |
| 2005/0070251 A1 | 3/2005 | Satake et al. |
| 2005/0071250 A1 | 3/2005 | Weisbach et al. |
| 2005/0080705 A1 | 4/2005 | Chaganti |
| 2005/0086147 A1 | 4/2005 | Woodruff et al. |
| 2005/0097022 A1 | 5/2005 | Silman |
| 2005/0102215 A1 | 5/2005 | Ausubel et al. |
| 2005/0108131 A1 | 5/2005 | Halikias |
| 2005/0125333 A1 | 6/2005 | Giannetti |
| 2005/0154629 A1 | 7/2005 | Matsuda et al. |
| 2005/0160020 A1 | 7/2005 | Asher et al. |
| 2005/0160024 A1 | 7/2005 | Soderborg et al. |
| 2005/0160028 A1 | 7/2005 | Asher et al. |
| 2005/0160029 A1 | 7/2005 | Asher et al. |
| 2005/0209954 A1 | 9/2005 | Asher et al. |
| 2005/0218218 A1 | 10/2005 | Koster |
| 2005/0267836 A1 | 12/2005 | Crosthwaite et al. |
| 2006/0003830 A1 | 1/2006 | Walker et al. |
| 2006/0004584 A1 | 1/2006 | Knight |
| 2006/0025208 A1 | 2/2006 | Ramsey |
| 2006/0026091 A1 | 2/2006 | Keen, Jr. et al. |
| 2006/0069635 A1 | 3/2006 | Ram et al. |
| 2006/0080220 A1 | 4/2006 | Samuel et al. |
| 2006/0085320 A1 | 4/2006 | Owens et al. |
| 2006/0100006 A1 | 5/2006 | Mitchell et al. |
| 2006/0105840 A1 | 5/2006 | Graeve |
| 2006/0116950 A1 | 6/2006 | Poffenberger et al. |
| 2006/0123092 A1 | 6/2006 | Madams et al. |

(56) References Cited

U.S. PATENT DOCUMENTS

| | | |
|---|---|---|
| 2006/0143099 A1 | 6/2006 | Partlow et al. |
| 2006/0143110 A1 | 6/2006 | Keiser et al. |
| 2006/0173761 A1 | 8/2006 | Costakis |
| 2006/0173764 A1 | 8/2006 | Costakis et al. |
| 2006/0195355 A1 | 8/2006 | Lundgren |
| 2006/0235783 A1 | 10/2006 | Ryles et al. |
| 2006/0240852 A1 | 10/2006 | Al-Sarawi |
| 2006/0258429 A1 | 11/2006 | Manning et al. |
| 2006/0259312 A1 | 11/2006 | De Titta |
| 2006/0259381 A1 | 11/2006 | Gershon |
| 2006/0277135 A1 | 12/2006 | Jain et al. |
| 2006/0293985 A1 | 12/2006 | Lederman et al. |
| 2006/0293995 A1 | 12/2006 | Borgs et al. |
| 2007/0010314 A1 | 1/2007 | Tulley et al. |
| 2007/0054718 A1 | 3/2007 | Del Prado |
| 2007/0060380 A1 | 3/2007 | McMonigle et al. |
| 2007/0061240 A1 | 3/2007 | Jain et al. |
| 2007/0073608 A1 | 3/2007 | Garcia |
| 2007/0087815 A1 | 4/2007 | Van Luchene |
| 2007/0087816 A1 | 4/2007 | Van Luchene |
| 2007/0088661 A1 | 4/2007 | De Verdier et al. |
| 2007/0100729 A1 | 5/2007 | Chen |
| 2007/0130040 A1 | 6/2007 | Stinski |
| 2007/0136074 A1 | 6/2007 | Hahn et al. |
| 2007/0156594 A1 | 7/2007 | McGucken |
| 2007/0168268 A1 | 7/2007 | Lange et al. |
| 2007/0174171 A1 | 7/2007 | Sheffield |
| 2007/0207849 A1 | 9/2007 | Asher et al. |
| 2007/0208642 A1 | 9/2007 | Asher et al. |
| 2007/0225069 A1 | 9/2007 | Garahi et al. |
| 2007/0255965 A1 | 11/2007 | McGucken |
| 2007/0298871 A1 | 12/2007 | Asher et al. |
| 2008/0015969 A1 | 1/2008 | Mowshowitz |
| 2008/0026825 A1 | 1/2008 | Yoshioka |
| 2008/0032786 A1 | 2/2008 | Hosokawa |
| 2008/0088087 A1 | 4/2008 | Weitzman et al. |
| 2008/0153579 A1 | 6/2008 | Brenner et al. |
| 2008/0183611 A1 | 7/2008 | Frischer |
| 2008/0195459 A1 | 8/2008 | Stinski |
| 2008/0200242 A1 | 8/2008 | Ginsberg et al. |
| 2008/0207297 A1 | 8/2008 | Zilba |
| 2008/0275824 A1 | 11/2008 | Assia et al. |
| 2009/0017905 A1 | 1/2009 | Meckenzie et al. |
| 2009/0061995 A1 | 3/2009 | Assia et al. |
| 2009/0062016 A1 | 3/2009 | Assia et al. |
| 2009/0186689 A1 | 7/2009 | Hughes et al. |
| 2009/0210335 A1 | 8/2009 | Asher et al. |
| 2009/0247286 A1 | 10/2009 | Inamura |
| 2010/0160012 A1 | 6/2010 | Amaitis et al. |
| 2010/0173697 A1 | 7/2010 | Van Luchene |
| 2010/0197382 A1 | 8/2010 | Van Luchene |
| 2010/0210335 A1 | 8/2010 | Goto et al. |
| 2010/0216545 A1 | 8/2010 | Lange et al. |
| 2013/0157755 A1 | 6/2013 | Amaitis |
| 2013/0282551 A1 | 10/2013 | Keiser |

FOREIGN PATENT DOCUMENTS

| | | |
|---|---|---|
| DE | 3539545 A1 | 7/1986 |
| EP | 0 739 526 | 10/1995 |
| EP | 1 132 836 | 9/2001 |
| EP | 1 363 430 | 5/2002 |
| GB | 2180675 | 4/1987 |
| GB | 2299425 | 10/1996 |
| GB | 1574447 | 9/2008 |
| JP | 2002-007712 | 1/2002 |
| JP | 2002049789 | 2/2002 |
| JP | 2002-099733 | 4/2002 |
| JP | 2004-513409 | 4/2004 |
| JP | 2005-301588 | 10/2005 |
| JP | 2006-012098 | 1/2006 |
| KR | 2001065086 | 7/2001 |
| KR | 2001098204 | 11/2001 |
| KR | 2002042036 | 6/2002 |
| KR | 2004-0062806 | 7/2004 |
| WO | WO93/10503 A1 | 5/1993 |
| WO | WO96/41315 A1 | 12/1996 |
| WO | WO98/58333 A1 | 12/1998 |
| WO | WO 01/98983 | 6/2000 |
| WO | WO 00/79442 A1 | 12/2000 |
| WO | WO01/16825 A1 | 3/2001 |
| WO | WO01/39056 A1 | 5/2001 |
| WO | WO02/12986 | 8/2001 |
| WO | WO 01/77861 | 10/2001 |
| WO | WO 01/77940 | 10/2001 |
| WO | WO 01/77964 A2 | 10/2001 |
| WO | WO 02/46999 | 11/2001 |
| WO | WO 02/25547 | 3/2002 |
| WO | WO 03/010720 | 2/2003 |
| WO | WO 03/090102 | 10/2003 |
| WO | WO 03/100567 | 12/2003 |
| WO | WO 03/107288 | 12/2003 |
| WO | WO2004/031899 | 4/2004 |
| WO | WO 2004/090681 A3 | 10/2004 |
| WO | WO2005/001728 | 1/2005 |
| WO | WO 2005/017700 | 2/2005 |

OTHER PUBLICATIONS

"A New Craze for March's Maddest: Online 'Trading' of NCAA Shares", Barbara Martinez, The New York Times Company: Abstracts, Mar. 8, 1994.

The Internet Bull Market in Movies, Newsweek, Yahlin Chang, Feb. 3, 1997, pp. 3.

SunSpot Maryland's Online Community, Taking Stock at the Box Office, Alex Dubin, printed on Aug. 19, 1997, 5 pgs.

Insider Trading—Hollywood Style, Entrepreneurial Edge Online, OnlinePress.com, Matthew Ragas, Feb. 4, 1998, 3 pgs.

Amex.com, The Street.com, Across the Street: Buying Stock in Hollywood, Jeffrey L. Newman, Nov. 17, 1997, 2 pgs.

Engineers, Hollywood Stock Exchange, printed on Nov. 13, 1997, 2 pgs.

The Rogue Market Journal, The Power Play on Popular Culture, A Letter from the Editor, print on Dec. 30, 1996, 18 pgs.

The New York Times, The Hollywood Stock Market: You Can't Lose, Laura Pedersen-Pietersen, Jan. 11, 1998, 3 pgs.

Bloomfield, Robert. "The interdependence of reporting discretion and informational efficiency in laboratory markets," The Accounting Review, v. 71, pp. 493-511, Oct. 1996.

Chan, K.C. et al."Market structure and the intraday pattern of bid-ask spreads for NASDAQ securities," The Journal of Business, v. 68, n. 1, p. 35, Jan. 1995.

Cones; 43 Ways to Finance Your Feature Film. 1995. pp. 47 and 45.

Cones, John W. and Wilke, Pete, "Investor Financing of Independent Film", 1998.

"Digital Commerce on Increase"; Publishing Technology Review, v2, n2, Jan. 1995.

Jack Feuer: Disc Driven. Findarticles.com; Jul. 12, 1999.

Freund, William C. "Trading stock around the clock: the future growth of global electronic markets," California Management Review, v. 34, n. 1, p. 87, 1991.

Hakansson, Nils H. et al. "On the feasibility of automated market making by a programmed specialist," Journal of Finance, vol. XL, No. 1, pp. 1-20, Mar. 1985.

Saul Hansell, "Today, Shoppers on Internet Get Access to Electronic Cash", The New York Times, Section d, p. 4, Col. 5, Oct. 1995.

Howard, Barbara. "The trade: technology aims to take the final step," Institutional Investor, v. 24, n. 1, p. S15, Jan. 1991.

Peter H. Lewis, "Attention Internet Shoppers: E-Cash Is Here", The New York Times, Section D, p. 4, Col. 4, Oct. 1994.

Lights, Camera, Capital On-line Investing, Debra Kaufman, WIRED Magazine, May 2001, 1 sheet.

Lindsey, Richard R. and Ulrike Schaede. "Specialist vs. Saitori: market-making in New York and Tokyo," Financial Analysts Journal, v. 48, n. 4, pp. 48-57, Jul. 1992.

MediaX and CMC International Records Team Up for Exclusive Download Campaigns with Major Artists. PR Newswire, Dec. 9, 1999.

(56) References Cited

OTHER PUBLICATIONS

Nash, Kim S., "Cybercash at risk: Money laws lacking", Computerworld, Dec. 1996.

Michael Schrage, "Firnis Quietly Forming Own Economies", San Jose Mercury News, Jul. 1992.

Ventura County Review; The Los Angeles Times; Dec. 15, 1998.

Ye, Jia, "An Investigation of Market Fragmentation and the Specialist's Quotation Strategy (Information Risk, Liquidity, Bid Ask Spread", 1995, vol. 57/03-A of Dissertation Abstracts International, p. 1260, 97 pgs.

American Film Market; Hollywoodnet.com; 1997, http://www.hollywoodnet.com/conferences/afm97.htm.

Astral Media The Harold Greenberg Fund's Equity Investment Program; 1992, ttp://www.tmn.ca/hgfund/pdf/fundEquityJune2002.pdf.

Avary's Domain—Interviews—Multimeter Magazine Interview, Mar. 3, 1994; pp. 9-10, http://www.avary.com/killingzoe/details/interview.kz.millimetermag.html.

Canadians turn to co-finance, pre-sales for TV prod'n coin. Findarticles.com, Jan. 19, 1998, http://www.findarticles.com/cf_0/m1312/n10_v369/20371093/print.jhtml.

Tuchlin; Smooth Negotiating: Making the Director Deal. 1998 The Internet printout.

USPTO Office Action for U.S. Appl. No. 11/279,997, mailed Nov. 10, 2009 (25 pages).

International Preliminary Report on Patentability for International Application No. PCT/US06/28805, dated Jan. 29, 2008 (4 pages).

U.S. Appl. No. 12/614,610, filed Nov. 9, 2009, Asher et al.

USPTO Office Action for U.S. Appl. No. 10/655,409, May 26, 2010 (13 pages).

USPTO Office Action for U.S. Appl. No. 11/189,262, Apr. 1, 2010 (19 pages).

USPTO Pre-Brief Appeal Conference Decision for U.S. Appl. No. 11/279,997, Jun. 3, 2010 (2 pages).

USPTO Pre-Brief Appeal Conference Decision for U.S. Appl. No. 11/379,171, Jun. 7, 2010 (2 pages).

International Preliminary Report on Patentability for International Application No. PCT/US07/09389, dated Oct. 22, 2008 (5 pages).

International Preliminary Report on Patentability for International Application No. PCT/US07/09383, dated Oct. 22, 2008 (6 pages).

International Preliminary Report on Patentability for International Application No. PCT/US04/09798, dated Oct. 1, 2005 (4 pages).

International Preliminary Report on Patentability for International Application No. PCT/US04/09796, dated Apr. 28, 2009 (4 pages).

USPTO Office Action for U.S. Appl. No. 09/660,296, Aug. 27, 2003 (10 pages).

USPTO Office Action for U.S. Appl. No. 09/660,296, May 18, 2004 (14 pages).

USPTO Advisory Action for U.S. Appl. No. 09/660,296, Oct. 6, 2004 (3 pages).

USPTO Office Action for U.S. Appl. No. 09/660,296, Dec. 30, 2004 (31 pages).

USPTO Office Action for U.S. Appl. No. 09/660,296, Jun. 28, 2005 (25 pages).

USPTO Office Action for U.S. Appl. No. 09/660,296, Jan. 30, 2006 (16 pages).

"A New Craze for March's Maddest: Online 'Trading' of NCAA Shares", Barbara Martinez, The New York Times Company: Abstracts, Mar. 8, 1994 (1 page).

Film Finances, Inc. The World Leader in Completion Guarantees. Oct. 1999 Internet print-out (1 page).

Mukta Arts Limited; the Internet print-out; 1999 (20 pages).

"Film Venture; Funding the Next Generation of Filmmakers," Film Investors Group, (5 pgs) undated.

Lee, "Sport Marketing Strategies Through the Analysis of Sport Consumer Behavior and Factors 2000 Influencing Attendance," UMI Dissertation Services, (139 pgs) 2000.

Eng, "Producing New Opportunities," Presstime, (2 pgs) Feb. 2005.

Notification of Transmittal of the International Search Report and Written Opinion of the International Searching Authority, or the Declaration for International Application No. PCT/US2005/01276 (9 pgs), Dec. 18, 2006.

Notification of Transmittal of the International Search Report and Written Opinion of the International Searching Authority, or the Declaration for International Application No. PCT/US2006/19316 (6 pgs), Jan. 8, 2007.

GOLIATH Business Knowledge on Demand; Innkeepers USA Trust Announces 2001 Dividend Allocation; (1 pg) Jan. 24, 2002.

Pre-Brief Appeal Conference Decision for U.S. Appl. No. 10/914,467, May 29, 2009 (2 pgs).

USPTO Office Action for U.S. Appl. No. 10/914,467, Mar. 19, 2008 (25 pgs).

USPTO Office Action for U.S. Appl. No. 11/133,972, Mar. 31, 2008 (18 pgs).

USPTO Office Action for U.S. Appl. No. 10/914,528, Feb. 20, 2008 (13 pgs).

USPTO Office Action for U.S. Appl. No. 10/914,528, Apr. 20, 2009 (11 pgs).

USPTO Office Action for U.S. Appl. No. 10/914,467, Dec. 15, 2008 (14 pgs).

USPTO Office Action for U.S. Appl. No. 11/133,972, Dec. 23, 2008 (20 pgs).

USPTO Office Action for U.S. Appl. No. 12/408,370; 11 pages; Aug. 6, 2009.

USPTO Office Action for U.S. Appl. No. 10/914,706, Feb. 21, 2008 (19 pgs).

Notice of Allowance for U.S. Appl. No. 10/914,528; 38 pages; Dec. 11, 2009.

Gaylord Entertainment, Warner Brothers pictures enters in to Co-Financing/production Pact, Sep. 14, 2000; Business Wire; Gaylord.

CINE-TEC Motion Picture Funding and Marketing Consultants, http://cine-tec.com/whatwedo.htm,2000 (CINE-TEC).

Notice of Allowance for U.S. Appl. No. 10/914,467; 38 pages; Jan. 28, 2010.

Notice of Allowance for U.S. Appl. No. 11/133,972; 22 pages; Nov. 25, 2009.

Michael C. McCabe; You have now entered the Bowie Bond Era; 1997 p. 8-16; www.freddiemac.com/finance/smm/july97/pdfs/mccabe.pdf (McCabe).

Office Action for U.S. Appl. No. 10/914,467, Feb. 1, 2008 (6 pgs).

USPTO Office Action for U.S. Appl. No. 10/914,706, Nov. 4, 2008 (8 pages).

USPTO Notice of Allowance and Fees Due for U.S. Appl. No. 10/914,706, Mar. 5, 2009 (7 pages).

USPTO Notice of Allowance and Fees Due for U.S. Appl. No. 10/914,706, Apr. 16, 2009 (2 pages).

USPTO Notice of Allowance and Fees Due for U.S. Appl. No. 10/914,706, May 12, 2009 (3 pages).

USPTO Notice of Allowance and Fees Due for U.S. Appl. No. 10/914,706, Jun. 11, 2009 (2 pages).

USPTO Notice of Allowance and Fees Due for U.S. Appl. No. 10/914,706, Jul. 2, 2009 (2 pages).

Canadian Exam Report for Application No. 2533524, dated Jun. 7, 2010 (4 pages).

USPTO Notice of Allowance and Fees Due for U.S. Appl. No. 12/408,370, Mar. 30, 2010 (7 pages).

C. Edward Fee, The Costs of Outside Equity Control; Evidence from Motion Picture Financing Decisions, The Journal of Business, vol. 75, No. 4 (Oct. 2002), pp. 681-711 (Costs).

EP Examination and Search Report for Application No. 05705731.7 dated Dec. 18, 2008; 4 pages.

AU Examiners Report for Application No. 2005208563 dated Nov. 25, 2009; 3 pages.

AU Notice of Acceptance for Application No. 2005208563 dated Feb. 7, 2010; 3 pages.

Office Action for U.S. Appl. No. 11/279,997, mailed Aug. 10, 2010, 23 pages.

U.S. Appl. No. 10/667,755, filed Sep. 22, 2003; 34 pages.

U.S. Appl. No. 10/667,923, filed Sep. 22, 2003; 43 pages.

Advisory Action for U.S. Appl. No. 10/914,467, Mar. 3, 2009 (2 pgs).

U.S. Appl. No. 10/914,528, filed Aug. 9, 2004; 35 pages.

(56) References Cited

OTHER PUBLICATIONS

U.S. Appl. No. 10/914,706, filed Aug. 9, 2004; 33 pages.
U.S. Appl. No. 12/408,370, filed Mar. 20, 2009; 33 pages.
U.S. Appl. No. 12/823,337, filed Jun. 25, 2010; 33 pages.
U.S. Appl. No. 10/914,467, filed Aug. 9, 2004; 31 pages.
U.S. Appl. No. 11/133,972, filed May 20, 2005; 36 pages.
U.S. Appl. No. 12/614,610, filed Nov. 9, 2009; 26 Pages.
U.S. Appl. No. 12/709,067, filed Feb. 19, 2010; 27 pages.
U.S. Appl. No. 12/709,047, filed Feb. 19, 2010; 44 pages.
U.S. Appl. No. 12/705,059, filed Feb. 12, 2010; 29 pages.
Notice of Allowance for U.S. Appl. No. 11/133,972; 2 pages; Mar. 1, 2010.
U.S. Appl. No. 10/655,409, filed Sep. 4, 2003; 20 pages.
U.S. Appl. No. 11/351,614, filed Feb. 9, 2006; 30 pages.
Pre-Brief Appeal Conference Decision for U.S. Appl. No. 11/133,972; 2 pages; Apr. 30, 2009.
U.S. Appl. No. 11/189,262, filed Jul. 25, 2005; 73 pages.
U.S. Appl. No. 11/279,997, filed Apr. 17, 2006; 65 pages.
U.S. Appl. No. 11/379,171, filed Apr. 18, 2006; 61 pages.
U.S. Appl. No. 08/620,906, filed Mar. 25, 1996; 31 pages.
U.S. Appl. No. 09/184,571, filed Nov. 2, 1998; 44 pages.
U.S. Appl. No. 10/301,527, filed Nov. 21, 2002; 44 pages.
U.S. Appl. No. 09/382,907, filed Aug. 25, 1999; 26 pages.
U.S. Appl. No. 10/822,484, filed Apr. 12, 2004; 26 pages.
Advisory Action for U.S. Appl. No. 10/655,409, mailed Nov. 17, 2005, 3 pages.
Pre-Brief Appeal Conference decision for U.S. Appl. No. 11/351,614; Jul. 7, 2009 (3 pages).
Examiner's Answer to Appeal Brief for U.S. Appl. No. 09/382,907, mailed Jul. 2, 2004, 17 pp.
U.S. Appl. No. 09/660,296, filed Sep. 13, 2000; 42 pages.
Pre-Brief Conference Decision for U.S. Appl. No. 11/189,262, mailed Feb. 26, 2010, 2 pp.
Office Action for U.S. Appl. No. 10/822,484, mailed Dec. 13, 2004, 5 pp.
Pre-Brief Appeal Conference Decision for U.S. Appl. No. 10/822,484, mailed Jan. 16, 2009, 2 pp.
Notice of Allowance for U.S. Appl. No. 10/822,484, mailed Oct. 1, 2009, 18 pp.
Examiner Interview Summary Record for U.S. Appl. No. 12/614,610 dated Aug. 17, 2010; 3 Pages.
Pre-Brief Appeal Conference Decision for U.S. Appl. No. 11/279,997, mailed Jun. 3, 2010, 2 pp.
USPTO Examiner Interview Summary Record for U.S. Appl. No. 10/667,755; dated Nov. 9, 2009 (3 pages).
Notice of Allowance for U.S. Appl. No. 10/914,528; 3 pages; Mar. 1, 2010.
Office Action for U.S. Appl. No. 10/914,528; 7 pages; Jan. 23, 2009.
Notice of Allowance for U.S. Appl. No. 10/914,467, Feb. 26, 2010 (3 pgs).
Notification of Transmittal of the International Search Report and Written Opinion of the International Searching Authority, or the Declaration for International Application No. PCT/US04/11206, mailed Jun. 5, 2007, 9 pp.
Notification of Transmittal of the International Search Report and Written Opinion of the International Searching Authority for International Application No. PCT/US07/09389, mailed Nov. 13, 2007, 8 pp.
Christine DeMartini et al., "A New and Improved Design for Multi-Object Iterative Auctions", 45 pp., dated Mar. 15, 1999.
In Science, The Real Power fo Artificial Markets, pp. 987-988, dated Feb. 9, 2001.
Net Exchange Speaks at Eye for Energy Conference in Amsterdam, Net Exchange provides insight into evolution of energy trading, 2 pp., dated Mar. 28, 2001.
Net Exchange Architects of Markets, Market Architecture: Improving Markets by Enhancing Choice, 9 pp., May 2001.
Net Exchange Addresses Dash Optimization User Group; Net Exchange disuses the application of optimization software to the commerce function of deal-making, 2pp., dated Nov. 7, 2001.
Charles R. Plott et al.; Division of the Humanities and Social Sciences California Institute of Technology; Information Aggregation Mechanisms: Concept, Design and Implementation for a Sales Forecasting Problem, 34 pp., dated Mar. 2002.
Net Exchange Deploys in the Transportation Procurement Market; Net Exchange's advanced combined value trading framework selected for Schneider Logistics' SUMIT CVA procurement system, 2 pp., Jul. 8, 2002.
John O. Ledyard et al., Interfaces; The First uses of a Combined-Value Auction for Transportation Services; vol. 32, No. 5, pp. 4-12, dated Sep./Oct. 2002.
Joyce E. Berg et al., Information Systems Frontiers; Prediction Markets as Decision Support Systems, pp. 79-93, dated 2003.
Hal R. Varian; The New York Times; Can markets be used to help people make nonmarket decisions?, 3 pp., dated May 8, 2003.
Charles Polk et al; The Policy of Analysis Market: An Electronic Commerce Application of a Combinatorial Information Market; ACM 1-58113-679-X/03/0006, Jun. 9-12, 2003.
Net Exchange Expanding the Value of Commerce; The Policy Analysis Market: "Market in Death" or Your Next Decision Support Tool?, 15 pp., Sep. 9, 2003.
Harvard Business School Working Knowledge; You Can Bet on Idea Markets, 4 pp., dated Dec. 1, 2003.
Justin Wolfers et al., Journal of Economic Perspectives; Prediction Markets; vol. 18, No. 2, pp. 107-126, dated 2004.
James Surowiecki; Wired; Smarter Than the CEO; Issue 12.06; 3 pp., dated Jun. 2004.
Barbara Kiviat; TIME; The End of Management?; 5 pp., dated Jul. 6, 2004.
James M. Pethokoukis; Money & Business; All seeing all knowing, 2pp., Aug. 22, 2004.
Emile Servan-Schreiber et al.; Electronic Markets; Prediction Markets: Does Money Matter?; 11 pp., dated Sep. 2004.
Common Knowledge Markets; Swing State Presidential Prediction Markets; 2 pp., dated Oct. 6, 2004.
Chris Hibbert; CommerceNet Labs Technical Report 05-02; Zocalo: An Open-Source Platform for Deploying Prediction Markets, 21 pp., dated Feb. 2005.
NewsFutures Prediction Markets; Trading uncertainty for collective wisdom, 3 pp., dated Mar. 15, 2005.
Business Week; The Power of Us, Mass Collaboration on the Internet is shaking up business; 6 pp., dated Jun. 20, 2005.
Corey Hajim; FORTUNE; Making a Market in (almost) anything; pp. 103-106, dated Aug. 8, 2005.
Prediction Markets Blog by Consensus Point; Popular Prediction market Software Becomes Open Source; 3 pp., dated Aug. 29, 2005.
Bill Saporito; TIME; Place Your Bets! On terrorism, on politics, on your future. Why markets will have a say in almost everything; 1 pg., dated Oct. 24, 2005.
Alex Nyberg Stuart; CFO.com; Market Magic, Internal markets can solve thorny allocation problems and predict the future; 3 pp., dated Nov. 1, 2005.
CBS News; The Crowd Knows Best; 2 pp., dated Jan. 8, 2006.
Prediction Markets Blog by Consensus Point; Foresight Technologies Changes Name to 'Consensus Point'; 3 pp., Jan. 30, 2006.
Prediction Mrkt Conference Presentation, 4 pp., dated Feb. 6, 2006.
Usable Markets—markets, design, usability, research; Public Prediction Markets Heuristic Review: CorwdIQ; 9 pp., May 9, 2006.
Trendio; The founder of Trendio blogs to keep you informed of the latest developments on Trendio, to discuss the future of the site with you and to share some personal reflections, 2pp., dated Oct. 17, 2006.
Robin Hanson et al; Manipulators Increase Information Market Accuracy; pp. 1-11, dated Feb. 2, 2007.
Eric Benderoff; Chicago Tribune; Different Kind of Futures Market; 3 pp., dated Feb. 24, 2007.
Howard Wolinsky; Sun-Times News Group; Prediction market rolls with hunches; 1 pg., dated May 15, 2007.
Motoko Rich; The New York Times; Publisher to Let the Public Have a Vote on Book Projects; 3 pp., dated May 21, 2007.
The Cambridge-MIT Institute; Projects, Innovation Futures UK; 3 pp.
Ken Miguel; ABC7/KGO-TV/DT; Wisdom of Crowds; ABC7 Futures Market; 2 pp.

(56) References Cited

OTHER PUBLICATIONS

Emile Servan-Schreiber et al.; NewsFutures Prediction Markets; Presidential Markets; Presidential Reality Check; 6 pp.
Incentive Markets, Inc.; Incentive Market Prediction Games; 1 pg.
Common Knowledge Markets; 7 pp.
Net Exchange Expanding the Value of Commerce; White Papers; 4 pp.
NewsFutures Prediction Markets; Trading uncertainty for collective wisdom, 4 pp.
NewsFutures; About the Company, NewsFutures in the News, pg. 2.
Inside-Out Markets; Putting market forces to work inside your business, 4 pp.
Notification of the International Search Report and Written Opinion of the International Searching Authority for International Application No. PCT/US07/09383, mailed Nov. 7, 2007, 8 pp.
NetExchange Presents at Energy Venture Fair; Net Exchange presents innovative solutions that address challenges faced by the energy industry; 1 pg., dated Jun. 26, 2001.
News Futures Prediction Markets; Trading uncertainty for collective wisdom, 2 pp., dated Dec. 6, 2001.
Robin D. Hanson; IEEE Intelligent Systems, Trends & Controversies, Decision Markets, pp. 16-20, May/Jun. 1999.
Peter Bossaerts et al.; European Economic Review; Inducing liquidity in thin financial markets through combined-value trading mechanisms; pp. 1-25.
Kilmartin, Liam, et al., Development of an Interactive Voice Response System for a GSM SMS based Share Price Server, DSP UK—Sandown Exhibition Centre, pp. 89-93, dated Dec. 31, 1997.
Friel, Dermot, et al., "An Automated Stock Price Delivery System Based on the GSM Short Message Service," IEEE, pp. 1591-1595 including Figure 3, dated 1998.
Nelson, Darin, et al., (Design Issues in Multimedia Messaging for Next Generation Wireless Systems, pp. 98-103, dated 2001.
Cabral de Souza, Geraldo Marcelo, et al., Proceedings of the IASTED International Conference, Communications, Internet, & Information Technology, "A Gateway to Interconnect Corporate and Mobile Telephony Operator Networks for Two-way SMS Messages Interchange," pp. 449-453, dated Nov. 18, 2002.
Jack D. Glen, "Trading and information systems in two emerging stock market", East Asian Executive Reports, Dec. 15, 1994, vol. 16., Iss 12, pp. 1-4, dated Dec. 15, 1994.
Domowitz, I. et al., "Auctions as algorithms: computerized trade execution and price discovery", Journal of Economic Dynamics and Control, (J-Econ-Dyn-Control-Netherlands), Jan. 1994, vol. 18, No. 1, pp. 29-60.
Notification of Transmittal of the International Search Report and Written Opinion of the International Searching Authority, or the Declaration for International Application No. PCT/US06/28805, mailed Dec. 27, 2006, 6 pp.
Notification of the International Search Report for International Application No. PCT/US99/25793, mailed Aug. 25, 2000, 2 pp.
Preliminary Examination Report for International Application No. PCT/US99/25793, dated May 17, 2001, 4 pp.
Examination Report for European Patent Application No. 99965746.3, mailed Nov. 27, 2007, 7 pp.
Internet Printout: "Who We Are", Wall Street Survivor, http://www.wallstreetsurvivor.com/Public/Content/About.aspx, downloaded Jul. 9, 2009, 2 pp.
Office Action for U.S. Appl. No. 11/379,171, mailed Jan. 29, 2009, 14 pp.
Office Action for U.S. Appl. No. 10/822,484, mailed May 6, 2005, 5 pp.
Office Action for U.S. Appl. No. 10/822,484, mailed Nov. 7, 2005, 16 pp.
Office Action for U.S. Appl. No. 10/822,484, mailed May 31, 2006, 19 pp.
Office Action for U.S. Appl. No. 10/822,484, mailed Dec. 1, 2006, 8 pp.
Office Action for U.S. Appl. No. 10/822,484, mailed Jun. 5, 2007, 15 pp.
Office Action for U.S. Appl. No. 10/822,484, mailed Nov. 20, 2007, 15 pp.
Office Action for U.S. Appl. No. 10/822,484, mailed Jun. 17, 2008, 21 pp.
Advisory Action for U.S. Appl. No. 10/822,484, mailed Aug. 14, 2006, 3 pp.
Office Action for U.S. Appl. No. 11/279,997, mailed Jan. 14, 2009, 15 pp.
Examiner Interview Summary for U.S. Appl. No. 11/279,997, mailed Jul. 9, 2009, 2 pp.
Examiner Interview Summary for U.S. Appl. No. 11/279,997, mailed Jun. 22, 2009, 2 pp.
Examiner Interview Summary for U.S. Appl. No. 10/822,484, mailed Mar. 22, 2007, 3 pp.
Examiner Interview Summary for U.S. Appl. No. 10/822,484, mailed Jul. 10, 2009, 4 pp.
Office Action for U.S. Appl. No. 10/301,527, mailed Oct. 8, 2003, 6 pp.
Office Action for U.S. Appl. No. 10/301,527, mailed Jul. 28, 2004, 6 pp.
Office Action for U.S. Appl. No. 10/301,527, mailed Nov. 23, 2004, 5 pp.
Notice of Allowance for U.S. Appl. No. 10/301,527, mailed Apr. 25, 2005, 10 pp.
Office Action for U.S. Appl. No. 10/655,409, mailed Jan. 27, 2005, 14 pp.
Office Action for U.S. Appl. No. 10/655,409, mailed Aug. 11, 2005, 10 pp.
Office Action for U.S. Appl. No. 10/655,409, mailed Feb. 15, 2006, 17 pp.
Office Action for U.S. Appl. No. 10/655,409, mailed Sep. 7, 2006, 16 pp.
Office Action for U.S. Appl. No. 10/655,409, mailed Sep. 14, 2007, 22 pp.
Office Action for U.S. Appl. No. 10/655,409, mailed Jan. 28, 2009, 22 pp.
Office Action for U.S. Appl. No. 11/351,614, mailed Sep. 19, 2007, 11 pp.
Office Action for U.S. Appl. No. 11/351,614, mailed Oct. 2, 2008, 15 pp.
Office Action for U.S. Appl. No. 09/382,907, mailed Sep. 12, 2000, 11 pp.
Office Action for U.S. Appl. No. 09/382,907, mailed May 29, 2001, 9 pp.
Office Action for U.S. Appl. No. 09/382,907, mailed May 9, 2002, 9 pp.
Office Action for U.S. Appl. No. 09/382,907, mailed Apr. 30, 2003, 8 pp.
Notice of Allowance for U.S. Appl. No. 09/382,907, mailed Nov. 25, 2008, 13 pp.
Office Action for U.S. Appl. No. 11/189,262, mailed Jan. 11, 2008, 23 pp.
Office Action for U.S. Appl. No. 11/189,262, mailed Sep. 30, 2008, 15 pp.
Martinez, Barbara, "A New Craze for March's Maddest: Online 'Trading' of NCAA Shares," The Wall Street Journal, 1 page, dated Mar. 8, 1994.
Chang, Yahlin, "The Internet: Bull Market in Movies," Newsweek, 1 page, dated Feb. 3, 1997.
Dubin, Alex, "Sunspot: Maryland's Online Community, Taking Stock at the Box Office," 5 pages, dated Aug. 19, 1997.
Ragas, Matthew, OnlinePress.com, Insider Trading—Hollywood Style, 3 pages, dated Feb. 4, 1998.
Engineers, Hollywood Stock Exchange, 2 pages, dated Nov. 13, 1997.
The Rogue Market Journal, The Power Play on Popular Culture, A Letter from the Editor, 18 pages, dated Dec. 30, 1996.
Pedersen-Pietersen, Laura, "The Hollywood Stock Market: You Can't Lose," The New York Times, Section 3, p. 4, col. 1, 3 pages, dated Jan. 11. 1998.
Film Finances, Inc. The World Leader in Completion Guarantees, Internet print-out, 1 page, dated Nov. 23, 2005.

(56) References Cited

OTHER PUBLICATIONS

Film Finances, Inc., Sample Completion Guaranty; internet printout, Aug. 2000, 14 pages.
Newman, Jeffrey L., Amex.com, The Street.com, Across the Street: Buying Stock in Hollywood, 2 pages, dated Nov. 17, 1997.
Klapwald, Thea, "Prod'n. co. born from Net game", Special Issue: The Independents; Daily Variety, Jul. 24, 1997, 2pp.
Leslie Eaton, You Too Can Be Rated AAA, N.Y. Times, Jun. 7, 1998.
Leslie M. Fairfax, When You Wish Upon a Star: Explaining the Cautious Growth of Royalty Backed Securitization, Columbia Business Law Review, 1999.
Thomas S. Gruca, et al., The Effect of Electronic Markets on Forecasts of New Product Success, Information Systems Frontiers 5:1, 95-105, 2003 (Kluwer Academic Publishers 2003).
Notice of Allowance for U.S. Appl. No. 12/614,610; Oct. 6, 2010; 62 pages.
Newswire; "Funbets.com Jumps into 2nd Place among Fantasy Sports Web Sites."; Dec. 15, 2000; pp. 1 and 2.
USPTO Office Action for U.S. Appl. No. 11/189,262; Nov. 23, 2010; 20 pages.
USPTO Office Action for U.S. Appl. No. 11/351,614; Nov. 12, 2010; 24 pages.
AU Examination Report for Application No. 2007201720; 2 pages; Nov. 17, 2010.
Notice of Allowance for U.S. Appl. No. 12/823,337; 9 pages; Sep. 20, 2010.
JP Office Action for Application No. 2008-524053 dated Jan. 4, 2011; 9 pages. (including English Translation).
USPTO Office Action for U.S. Appl. No. 12/709,067; Dec. 27, 2010; 23 pages.
USPTO Office Action for U.S. Appl. No. 11/279,997; mailed Nov. 9, 2010 (22 pages).
USPTO Office Action for U.S. Appl. No. 11/379,171; Sep. 27, 2010; 16 pages.
Definition of dividend from www.wikipedia.org, revision as of Aug. 13, 2010 (obtained Dec. 21, 2010 at: http://en.wikipedia.org/w/index.php?title=Dividend&oldid=378636953) (7 pages).
AU Examiners Report for Application No. 2010201927 dated Apr. 28, 2011; 2 pages.
USPTO Office Action for U.S. Appl. No. 10/667,923; dated Mar. 10, 2011 (54 pages).
Notice of Allowance for U.S. Appl. No. 12/823,337 dated May 13, 2011; 10 pages.
AU Examiners Report for Application No. 2010201927 dated Mar. 28, 2011; 2 pages.
"F1 Championship Scoring". From Wikipedia, The Free Encyclopedia. [online], [retrieved Mar. 2, 2011]. Retrieved from the internet <URL:http://en.wikipedia.org/wiki/List_of_formula_one_world_championship_points_scoring_systems >. 4 pages.
Canadian Exam Report for Application No. 2533524, dated Jan. 5, 2012 (3 pages).
U.S. PTO Office Action for U.S. Appl. No. 12/709,047; Jan. 20, 2012; 16 pages.
U.S. PTO Office Action for U.S. Appl. No. 13/245,142; Feb. 2, 2012; 25 pages.
Michael Markowitz, The Record (Bergen County,NJ) Hubco Seeks Loyalty with Discount Shaes, Mar. 25, 1999 (Hubco).
USPTO Advisory Action for U.S. Appl. No. 10/655,409 dated Sep. 30, 2010; 3 pages.
USPTO Office Action for U.S. Appl. No. 11/351,614; Jun. 21, 2011; 2 pages.
USPTO Advisory Action for U.S. Appl. No. 10/667,923; dated Jun. 4, 2012; 3 pages.
USPTO Office Action for U.S. Appl. No. 10/667,923; dated Nov. 17, 2011; 16 pages.
USPTO Office Action for U.S. Appl. No. 10/667,755, dated Jan. 9, 2012; 39 pages.
USPTO Office Action for U.S. Appl. No. 12/709,067; Aug. 3, 2011; 18 pages.
USPTO Office Action for U.S. Appl. No. 10/655,409 dated Dec. 13, 2010; 13 pages.
USPTO Office Action for U.S. Appl. No. 10/655,409 dated Sep. 1, 2011; 16 pages.
USPTO Notice of Panel Decision for U.S. Appl. No. 10/655,409 dated Mar. 28, 2012; 2 pages.
CA Office Action for Application No. 2615642; Apr. 5, 2012; 4 pages.
USPTO Notice of Panel Decision for U.S. Appl. No. 10/667,923; dated Jun. 27, 2012; 2 pages.
USPTO Notice of Allowance for U.S. Appl. No. 10/667,923; Sep. 12, 2012; 45 pages.
USPTO Final Office Action for U.S. Appl. No. 10/667,755, dated Aug. 28, 2012; 42 pages.
USPTO Final Office Action for U.S. Appl. No. 13/245,142; Nov. 26, 2012; 25 pages.
USPTO Office Action for U.S. Appl. No. 12/709,047; Sep. 13, 2012; 12 pages.
Japan Office Action for Application No. 2007-109477; Jun. 19, 2012; 6 pages.
Australian Examiner's Report for Appl No. 2007201720; Nov. 17, 2010; 2 pages.
Heritage S, Dancing on Ice Betting Odds—Starts Tomorrow, Who'll Win? Jan. 13, 2006; retrieved from http://www/hecklersspray.com/dancing-on-ice-betting-odds-starts-tomorrow-wholl-win/20061981.php on Nov. 16, 2010.
Australian Examiner's Report for Appl No. 2011201362; Nov. 9, 2011; 3 pages.
Australian Notice of Acceptance for Appl No. 2011201362; Jan. 12, 2012; 3 pages.
European Extended Search Report for Appl No. 06788399.1; Sep. 6, 2011; 6 pages.
USPTO Office Action for U.S. Appl. No. 11/279,997; mailed Aug. 12, 2011 (22 pages).
Ramanathan, "Determinants of Value in Pharmaceutical Innovation: A Property Rights Approach", University of Illinois at Urbana-Champaign, 1999, vol. 6009A of Dissertations Abstracts International, p. 3437, 139 pages.
USPTO Final Office Action for U.S. Appl. No. 11/279,997; mailed Mar. 19, 2012 (27 pages).
USPTO Office Action for U.S. Appl. No. 12/705,059; mailed Sep. 24, 2012 (11 pages).
AU Examiners Report for Application No. 2010201927 dated Aug. 2, 2012; 4 pages.
USPTO Notice of Allowance for U.S. Appl. No. 10/655,409; mailed Feb. 28, 2013 (33 pages).
The Washington Post, Mexico to Sell Off Part of Oil Monopoly; [Capital Edition] Tod Robberson. The Washington Post (pre-1997 Fulltext). Washington D.C.; Jan. 3, 1995. p. a.01.
JP Decision of Final Rejection for Application No. 2007-109477; Feb. 12, 2013; 5 pages.
USPTO Office Action for U.S. Appl. No. 12/709,067; pp. Apr. 12, 2012; 27 pages.
USPTO Office Action for U.S. Appl. No. 12/709,067; Dec. 18, 2012; 21 pages.
USPTO Office Action for U.S. Appl. No. 13/615,914; Apr. 23, 2013; 22 pages.
USPTO Notice of Allowance for U.S. Appl. No. 12/705,059; Apr. 2, 2013; 6 pages.
Indian Office Action for Application No. 4705/DELNP/2006; Jan. 31, 2013; 1 page.
USPTO Final Office Action for U.S. Appl. No. 12/709,047; May 9, 2013; 13 pages.
USPTO Examiners Answer U.S. Appl. No. 11/189,262; mailed Apr. 25, 2013 (11 pages).
USPTO Office Action for U.S. Appl. No. 13/615,865; Jun. 17, 2013; 23 pages.
"Wolfram Range". From Wolfram MathWorld [online] [retrieved on Jun. 11, 2013]. Retrieved from the Internet <URL:http://mathworld.wolfram.com/Range.html>, 1 page.
"Wolfram Set". From Wolfram MathWorld [online] [retrieved on Jun. 11, 2013]. Retrieved from the Internet <URL:http://mathworld.wolfram.com/Set.html>, 1 page.

(56) References Cited

OTHER PUBLICATIONS

USPTO Final Office Action for U.S. Appl. No. 11/279,997; mailed Dec. 13, 2012 (30 pages).
USPTO Final Office Action for U.S. Appl. No. 11/279,997; mailed Jun. 28, 2013 (29 pages).
US Notice of Allowance for U.S. Appl. No. 10/655,409; Aug. 2, 2013; 7 pages.
New-York State Canals.: Their Finances, Report of the Canal Auditor. New York Daily Times (1851-1857); Jan 9, 1855; ProQuest Historical Newspapers; The New York Times (1851-2009).
US Office Action for U.S. Appl. No. 13/838,062; Oct. 9, 2013; 18 pages.
US Office Action for U.S. Appl. No. 12/906,381; Oct. 7, 2013; 27 pages.
US Notice of Allowance for U.S. Appl. No. 13/615,892; Jul. 24, 2013; 13 pages.
U.S. Examiner's Answer for U.S. Appl. No. 10/667,755; Oct. 24, 2013; 16 pages.
U.S. Office Action for U.S. Appl. No. 10/667,755; Jan. 6, 2012; 37 pages.
U.S. Final Office Action for U.S. Appl. No. 10/667,755; Aug. 28, 2012; 42 pages.
U.S. Office Action for U.S. Appl. No. 13/839,029; Dec. 5, 2013; 13 pages.
US Notice of Allowance for U.S. Appl. No. 13/615,892; Nov. 8, 2013; 13 pages.
USPTO Final Office Action for U.S. Appl. No. 13/615,914; Nov. 29, 2013; 31 pages.
U.S. Office Action for U.S. Appl. No. 12/709,047; Dec. 19, 2013; 23 pages.
Film Finances, Inc. The World Leader in Completion Guarantees. Oct. 1999 Internet print-out.
Film Finances, Inc. The World Leader in Completion Guarantees. Sample Completion Guaranty; Aug. 2000 Internet print-out.
Australian Examiner's Report for Australian Application No. 2006272654, dated Jun. 24, 2009 (3 pages).
"NTRA All-Star Jockey Championship Special Wagers," dated unknown (3 pages).
"Wagering Information; Straight or Basic Wagers," Lone Star Park at Grand Prairie: Player's Guide, http://www.lonestarpark.comlbet_info.asp, printed May 8, 2007 (3 pages).
"Wagering Information; Straight or Basic Wagers," NTRA.com, http://www.ntra.com/news.asp?type=playthehorses&id=4799, printed May 8, 2007 (3 pages).
"Glossary of Terms," NTRA.com, http://www.ntra.com/news.asp?type=playthehorses&id=4797, printed May 8, 2007 (3 pages).
"The Basics of Horseplay," NTRA.com, http://www.ntra.com/news.asp?type=playthehorses&id=4795, printed May 8, 2007 (2 pages).
"Bet With the People Who Know Racing," Racing Daily Forum, Jul. 24, 2001 (15 pages).
"Quote of the Day; Bet of the Day," London Times, Jul. 30, 2003 (1 page).
The Patent Office Search Report from International Application No. GB 0320232.2, Dec. 17, 2003 (6 pages).
Scarne "Scarne's New Complete Guide to Gambling," Simon and Schuster, pp. 46-48 plus title and Copyright pages, dated 1961 (2 pages).
U.S. Appl. No. 10/667,755; filed Sep. 22, 2003, Amaitis, et al.
PCT Search Report for PCT/US04/09797, May 13, 2005 (9 pages).
Scarne "Scarne's New Complete Guide to Gambling", Simon and Schuster, pp. 132-133, 1974.
Daley, Ken. "Handicapping the Race; Bet on McGwire surging past Maris, Sosa fading at the wire" <URL: http://nl.newsbank.com/nlsearch/we/Archives?p_product=DM&p_theme=dm&p_action=search&p_maxdocs=200&p_topdoc=1&p_text_direct-0=OED3DAE8C5FC5A3A&p_field_direct-O=documenUd&p_perpage=1O&p_sort=YMD_date: D&s_trackval=GooglePM>, dated Aug. 27, 1998.

The New York Times, PLUS: Auto Racing; Winston Cup purse Increased by Nascar, accessed at: http://query.nytimes.com/gst/fullpage.html?res=9F03EOD81139F93AA15752COA9659C8B, published Jan. 29, 2003; (1 page).
The New York Times, Horse Racing; Purse may Rise for Super Derby, accessed at: http://query.nytimes.com/gst/fullpage.htmi?res=950DE7D81F31F936A15755COA96F948260, published Jun. 25, 1989 (1 page).
PCT Search Report for PCT/US04/10069, Jun. 17, 2005 (9 pages).
U.S. Appl. No. 10/667,923, filed Sep. 22, 2003 Amaitis, et al.
Google, Definition of "purse" accessed at: http://www.google.com/search?h1=en&rls=GGLD,GGLD:2004-30,GGLD:en&defl=e&q=..., on May 9, 2008; (2 pages).
rec.gambling.sports faq, Frequently Asked Questions about Sports Betting, Last Modified Feb. 15, 1996, pp. 1-8.
Parimutuel Betting; Wikipedia reference; http://en.wikipedia.org/wiki/Parimutuel_betting; last modified Jan. 26, 2008 (7 pages).
PCT Notification of Transmittal of the International Search Report and the Written Opinion of the International Searching Authority for International Application No. PCT/US04/09796; Jul. 21, 2008 (7 pages).
International Search Report for International Application No. PCT/US04/09798; Sep. 8, 2005 (1 page).
USPTO Office Action for U.S. Appl. No. 11/351,614; Sep. 18, 2009 (12 pages).
USPTO Office Action for U.S. Appl. No. 11/189,262; Aug. 21, 2009 (19 pages).
USPTO Office Action for U.S. Appl. No. 10/667,755; dated Jan. 12, 2009 (19 pages).
USPTO Office Action for U.S. Appl. No. 10/667,755; dated May 14, 2008 (19 pages).
USPTO Office Action for U.S. Appl. No. 10/667,923; dated Aug. 2, 2005 (12 pages).
USPTO Office Action for U.S. Appl. No. 10/667,923; dated Dec. 1, 2006 (17 pages).
USPTO Office Action for U.S. Appl. No. 10/667,923; dated Feb. 28, 2007 (3 pages).
USPTO Office Action for U.S. Appl. No. 10/667,923; dated Aug. 31, 2007 (9 pages).
USPTO Office Action for U.S. Appl. No. 10/667,923; dated Jan. 28, 2008 (10 pages).
USPTO Office Action for U.S. Appl. No. 10/667,923; dated Apr. 16, 2008 (3 pages).
USPTO Office Action for U.S. Appl. No. 10/667,923; dated May 15, 2008 (11 pages).
USPTO Office Action for U.S. Appl. No. 10/667,923; dated Nov. 4, 2008 (13 pages).
USPTO Examiner Interview Summary Record for U.S. Appl. No. 10/667,923; dated Sep. 15, 2009 (4 pages).
USPTO Examiner Interview Summary Record for U.S. Appl. No. 10/667,755; dated Jul. 20, 2009 (4 pages).
Jon Kiele; "Caveat Emptor: Understanding the Dynamics of the Futures Market"; Electrical World, vol. 210, No. 9, Sep. 1996; pp. 1-5.
"Atlantic International Entertainment, Ltd. (AIEE) Announces Third License Agreement for Internet Casino Extension (ICE) Product with Imperiamedia, Ltd."; PR Newswire; Friday, Jun. 18, 1999; pp. 1 and 2.
Donnelly, Craig, "Philadelphia Park Cancels Races Again as More Workers Join Strike the Bensalem Track's Three Off-Track Betting Sites Are Still Operating. So is Its Television Show", Philadelphia Inquirer, Dec. 30, 1995, p. C5, ProQuest.
"Big Names Raise Stakes in Internet Casinos", Evening Post, Aug. 4, 2001, p. 12.
USPTO Notice of Allowance and Examiner Interview Summary Record for U.S. Appl. No. 10/822,484; dated Oct. 1, 2009 (19 pages).
Office Action for U.S. Appl. No. 11/379,171, mailed Oct. 6, 2009 (28 pages).
Advisory Action for U.S. Appl. No. 09/382,907, mailed Sep. 3, 2003 (3 pages).
USPTO Office Action for U.S. Appl. No. 08/620,906; dated May 15, 1998 (14 pages).
USPTO Office Action for U.S. Appl. No. 08/620,906; dated Dec. 1, 1998 (9 pages).

(56) References Cited

OTHER PUBLICATIONS

USPTO Office Action for U.S. Appl. No. 08/620,906; dated Jun. 7, 1999 (4 pages).
USPTO Office Action for U.S. Appl. No. 09/184,571; dated Jun. 23, 2000 (13 pages).
USPTO Office Action for U.S. Appl. No. 09/184,571; dated Jan. 23, 2001 (6 pages).
USPTO Office Action for U.S. Appl. No. 09/184,571; dated Apr. 25, 2001 (5 pages).
USPTO Notice of Allowance for U.S. Appl. No. 09/184,571; dated Nov. 4, 2002 (4 pages).
U.S. Appl. No. 60/462,176, filed Apr. 11, 2003, in the name of Howard W. Lutnick et al (3 pages).

* cited by examiner

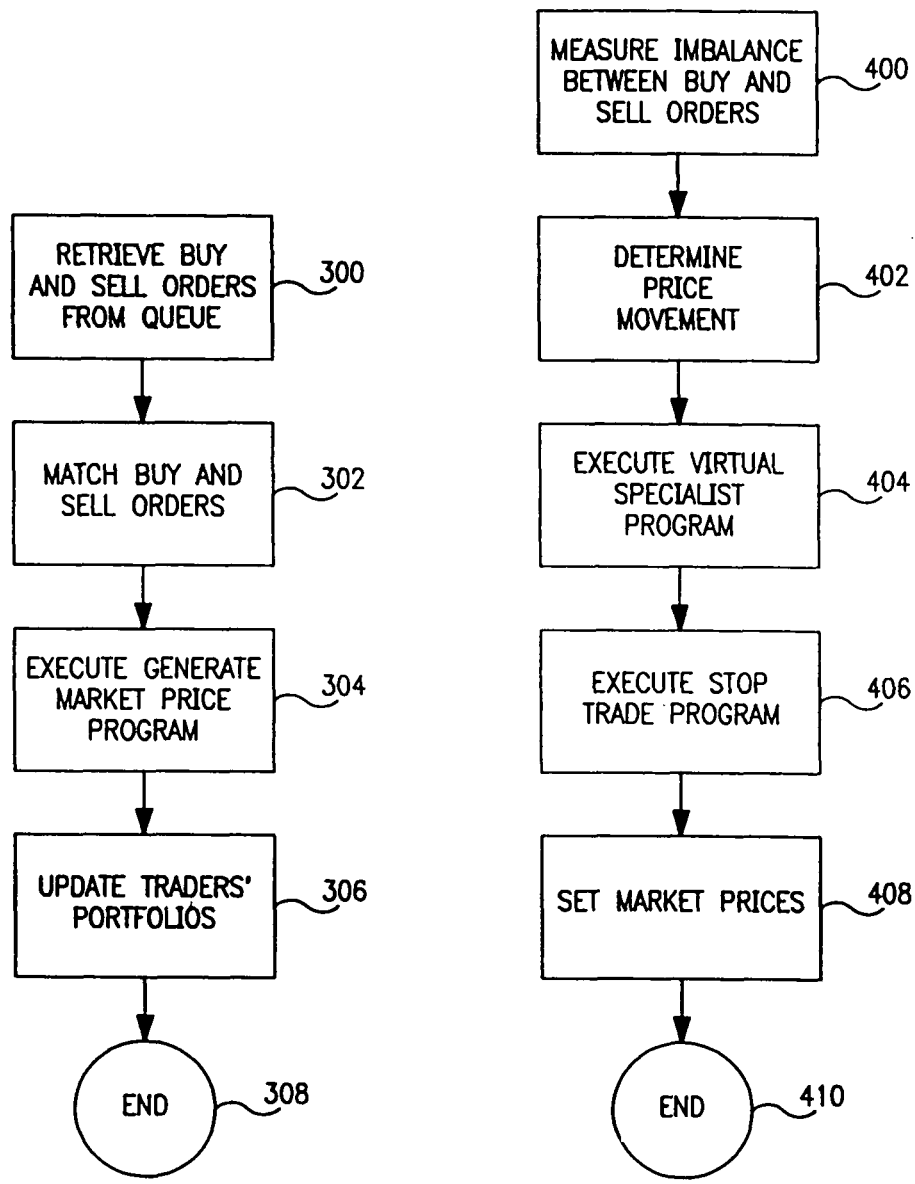

COMPUTER-IMPLEMENTED SECURITIES TRADING SYSTEM

This application is a continuation of U.S. application Ser. No. 09/184,571, filed Nov. 2, 1998, which is a continuation-in-part of U.S. application Ser. No. 08/620,906, filed Mar. 25, 1996, now U.S. Pat. No. 5,950,176, issued Sep. 7, 1999.

BACKGROUND OF THE INVENTION

This invention relates in general to computer-implemented financial systems, and in particular to an improved automated securities trading system.

Computer-implemented securities trading systems are well known in the art. One such system is that disclosed in U.S. Pat. No. 4,674,044, issued to Kalmus et al., entitled "Automated Securities Trading System", and incorporated by reference herein. These computer-implemented securities trading systems obtain bid and asked trades based on the bid and asked prices. However, there is generally still a human component to such systems.

For example, most financial markets also employ one or more market makers called "specialists." These specialists fill customer orders from the specialist's inventory position if there are no matches for the customer orders in the open market. In the prior art, the specialist function is not automated, but is performed by a firm or individual. Thus there is a need in the art for an improved computer-implemented trading system that includes an automated specialist function to create a market for the securities traded and to lessen the volatility of smaller securities markets.

BRIEF SUMMARY OF THE INVENTION

To overcome the limitations in the prior art described above, and to overcome other limitations that will become apparent upon reading and understanding the present specification, the present invention discloses method, apparatus and article of manufacture for a computer-implemented financial management system that permits the trading of securities via a network. In accordance with the present invention, a server computer receives buy and sell orders for derivative financial instruments from a plurality of client computers. The server computer matches the buy order to the sell orders and then generates a market price through the use of a virtual specialist program executed by the server computer. The virtual specialist program responds to an imbalance in the matching of the buy and sell orders.

An object of the present invention is to lessen the price volatility of derivative financial instruments traded in narrower markets.

A feature of the present invention is a virtual specialist program that engages in trading in the market to offset the price volatility and to provide liquidity to the market.

BRIEF DESCRIPTION OF THE DRAWINGS

Referring now to the drawings in which like reference numbers represent corresponding parts throughout:

FIG. 3 shows a flowchart illustrating the logic of the pricing/trading program of the first embodiment of the present invention;

FIG. 4 shows a flowchart illustrating the logic of the generate market price program of the first embodiment of the present invention;

DETAILED DESCRIPTION OF THE PREFERRED EMBODIMENTS

Figure 1:
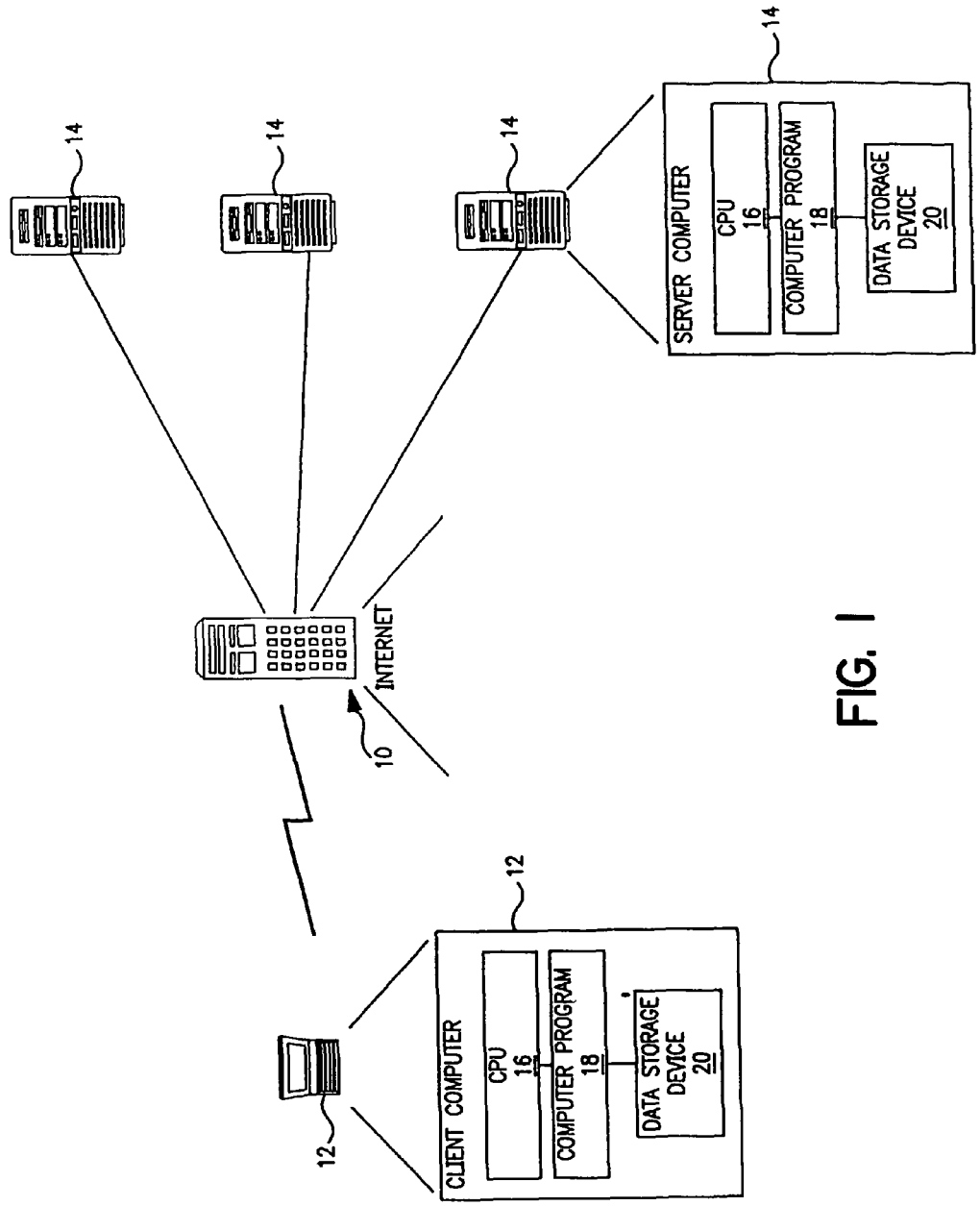
FIG. 1 shows a block diagram of an exemplary hardware environment of the present invention.

According to the present invention, a computer-implemented trading system is provided for derivative financial instruments. The computer-implemented trading system accepts buy and sell orders from traders for the derivative financial instruments, sets a market price based on the supply and demand, and participates in the market as a trader in order to minimize price volatility. One embodiment of the present invention is a computer-implemented Hollywood Stock Exchange (HSX), which may be implemented as a simulation (i.e., game) or as an actual trading system for derivative financial instruments representing movies, talent, CDs, and television programs. These derivatives could be purchased with virtual currency known as Hollywood dollars (H$) which are controlled by a virtual reserve bank program.

In one representative embodiment of the present invention, the derivative financial instruments are identified by a Current Trading List displayed for the traders that comprises a list of movies in various stages of production, talent, and other entertainment-oriented assets. The list contains:

name of the derivative financial instrument;
genre of the movie (action-adventure, mystery, western, comedy, etc.);
production status (scripting, pre-production, filming, editing, release, home-video, etc.);
number of shares in circulation;
last trading price (printed every 15 minutes)
price movement (i.e. +/−H$) since the previous midnight (PST);
price movement since the previous mid-day;
price movement year to date;
Traders can view the list sorted by:
name, alphabetically;
genre, alphabetically;
productions status, alphabetically;
most active (number of shares traded yesterday);
biggest gainers;
biggest losers; and
fastest movers today (e.g., fastest 20 movers up and fastest 20 movers down).

Similar information would be provided for other derivative financial instruments offered on the Hollywood Stock Exchange.

Each trader's portfolio is identified by a Portfolio data structure that comprises the trader's account status. This information includes:

the amount of cash in the trader's account (paid interest at the system discount rate plus some increment, compounded daily);
current percentage rate paid on cash balances;
the total value of held stocks at the last selling price;
the total value of held bonds at the last selling price;
total portfolio value (TPV) (cash+bonds+stocks);

percentage of TPV in cash;
percentage of TPV in bonds; and
percentage of TPV in stocks.

Traders can generate any number of different reports for display, including:

Lists of stocks and bonds being traded (see above);
index of total Hollywood stocks (HSXI) expressed as a number, with 1000 defined as the aggregate total stock price value on opening day, wherein HSXI=(today's gross stock-value)/(opening day gross stock-value);
index of total Hollywood bonds (HBXI) expressed as a number, with 1000 defined as the aggregate total bond price value on opening day, wherein HBXI=((today's gross bond-value)/(opening day gross bond-value));
index of total Hollywood Stock Exchange (HMXI) comprised of all stocks and bonds, and expressed as a number, with 1000 as the aggregate total stock price value on opening, wherein HMXI=((today's gross market-value)/(opening day gross market-value));
lists of the top market performers, e.g., the top 10 traders in percentage portfolio growth calculated as net portfolio value–change=(% change of cash)+(% change of stocks)+(% change of bonds), and for each of the categories: yesterday (midnight to midnight), last week (7 days, ending midnight, each Thursday), last month (closes at midnight last calendar day of month), last quarter (closes at midnight on last day of last month/quarter), year-to-date (running daily total of percentage value changes)/(days for year-to-date), and annually (closes at midnight on December 31 each year);
overall market condition report, including a list of stopped issues with:
name;
last trading price;
time that stop-trade condition occurred;
percentage the issue actually moved on-the-day before the stop-trade;
number of total shares and/or bonds traded today;
dollar value of total trades today;
number of buy and sell trades today; and
number of buy and sell trades this month.

Use of the above information guides traders in making future buy and sell orders.

With reference to FIG. 1, a block diagram illustrates an exemplary hardware environment for one embodiment of the present invention. More particularly, a typical distributed computer system is illustrated, which uses the Internet 10 to connect client computers 12 executing for example, Web browsers, to server computers 14 executing a computer program embodying the present invention. A typical combination of resources may include client computers 12 that are personal computers or work stations connected via the Internet 10 to server computers 14 that are personal computers, work stations, minicomputers, or mainframes.

Generally, both the client computers 12 and the server computers 14 are comprised of one or more CPUs 16, various amounts of RAM storing computer programs 20 and other data, and other components typically found in computers. In addition, both the client computers 12 and the server computers 14 may include one or more monitors, and fixed or removable data storage devices 20 such as hard disk drives, floppy disk drives, and/or CD-ROM drives. Also, input devices, such as mouse pointing devices and keyboards, may be included.

Both the client computers 12 and the server computers 14 operate under the control of an operating system, such as Windows, Macintosh, UNIX, etc. Further, both the client computers 12 and the server computers 14 each execute one or more computer programs 18 under the control of their respective operating systems. The present invention is preferably implemented as one or more computer programs 18 executed by the server computer 14, although in alternative embodiments these computer programs 18 may also be executed on the client computer 12.

Generally, the computer programs 18 implementing the present invention are tangibly embodied in a computer-readable medium, e.g., one or more of the fixed and/or removable data storage devices 20 attached to the computer. Under control of the operating system, the computer programs 18 may be loaded from the data storage devices 20 into the RAM of the computer for subsequent execution by the CPU 16. The computer programs 18 comprise instructions which, when read and executed by the computer, causes the computer to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
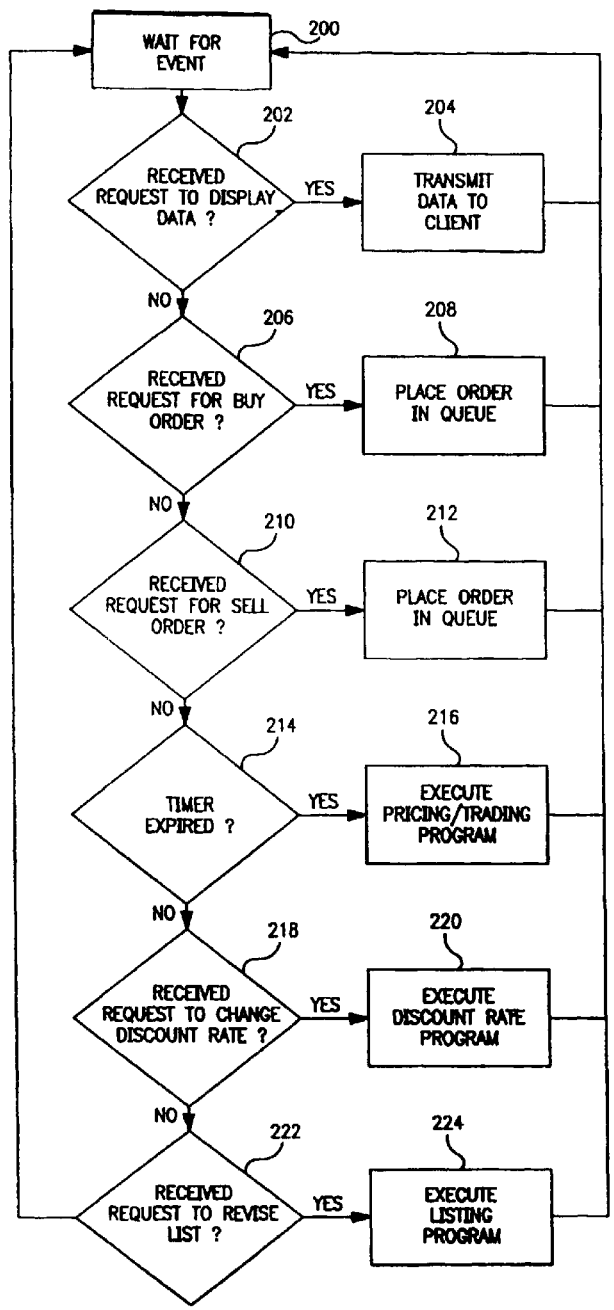
FIG. 2 shows a flowchart illustrating the general logic of a first embodiment of the present invention.

With reference to FIG. 2, a flowchart illustrates the general logic of one embodiment of the present invention. Block 200 represents the server computer 14 waiting for the next event to occur. Once the event occurs, control is transferred to blocks 202-224 to identify the event and respond accordingly.

Block 202 is a decision block that represents the server computer 14 determining whether it received a request to display data from the client computer 12. If so, block 204 represents the server computer 14 transmitting data to the client computer 12 for subsequent display. The data transmitted for display preferably includes at least three types of data: the current list of trading derivative financial instruments, the trader's portfolio, and other reports generated by the server computer 14.

Block 206 is a decision block that represents the server computer 14 determining whether it received a request to submit a buy order from the client computer 12 for a particular derivative financial instrument, e.g., stock or bond. If so, block 208 represents the server computer 14 processing the buy order by placing it in a queue in the memory of the server computer 14. The buy order is a data structure comprising:
trader's account number;
trader's name;
the time and date of the order;
the stock or bond to buy;
the cash balance in the trader's account; and
a text-field where the trader may enter the total number to buy (generally in multiples of 100).

In one embodiment of the present invention, the buy order waits in the queue for the expiration of a predetermined "sweep pricing cycle." The sweep pricing cycle occurs periodically, such as every 15 minutes, or during another specified time interval. The market price the trader actually pays for the derivative financial instrument is determined by the aggregate supply/demand for the derivative financial instrument at the end of the sweep pricing cycle during which the order was placed.

The market price is set by the pricing/trading program executed by the server computer, which is described below in FIG. 3. The trader's account is then charged the market price for the derivative financial instrument. If the purchase uses up all available cash in the trader's account, the trader is "loaned" enough money to pay for the purchase, and their account is charged interest at a predetermined rate, e.g., 18% a year compounded daily, on the negative account balance. The interest is charged against the trader's account until they accumulate more cash to zero out the balance, either by selling stocks or buying dollars.

Block 210 is a decision block that represents the server computer 14 determining whether it received a request to submit a sell order from the client computer 12. If so, block 212 represents the server computer 14 processing the sell order by placing it in queue in the memory of the server computer 14. The sell order is a data structure comprising:
  trader's account number;
    trader's name;
    the time and date of the order;
    the stock or bond to sell;
    the amount of the stock or bond in the trader's account; and
    a text-field where the trader may enter the total number to sell (generally in multiples of 100).

Like the buy order, the sell order waits in the queue for the expiration of the predetermined sweep pricing cycle. The market price at which the trader actually sells the derivative financial instrument is determined by the aggregate supply/demand for the derivative financial instrument at the end of the sweep pricing cycle during which the order was placed. The market price is set by the pricing/trading program executed by the server computer, which is described below in FIG. 3. The trader's account is then credited with the market price for the derivative financial instrument.

The sell order can be either produced by a trader or generated by the server computer 14, as will be explained in more detail below. For a sell order produced by a trader, he views his list of stocks or bonds on a monitor attached to the client computer and chooses to sell a quantity at the market price.

When the trader requests to view the list of stocks, the server computer 14 transmits certain information to the client computer 12 for display, including, for each stock owned, the last trading price (LTP), the quantity of stocks, the purchase price, and the date purchased, Similarly, when viewing the list of bonds, the server computer 14 transmits certain information to the client computer 12 for display, including, for each bond owned, the last trading price (LTP), the interest rate being earned for each kind of bond, the quantity of bonds, the purchase price, and the date purchased.

Block 214 is a decision block that represents the server computer 14 determining whether an internal timer for the sweep pricing cycle has expired. If so, block 216 represents the server computer 14 executing a pricing/trading program as described in FIG. 3.

Block 218 is a decision block that represents the server computer 14 determining whether it received a request to change the discount rate. If so, block 220 represents the server computer 14 executing a discount rate program. In order to add or subtract liquidity, the server computer 14 occasionally steps in to act as a virtual reserve bank program and adjust the discount rate. The discount rate is adjusted based on the performance of the specific industry of the market. For the Hollywood Stock Exchange, the discount rate is adjusted to add or subtract liquidity to affect the growth of the entertainment industry. When the server computer 14 lowers the discount, all the bonds seem to be a better deal, because the bonds are paying a fixed rate interest that never changes. This encourages traders to buy more bonds, and such surge in buying demand causes a correlated increase in bond prices as described above. The same thing happens to stocks, because traders are making less money on the interest being paid on the cash balance in their trading account. When the server computer 14 raises the discount rate, the bonds seem to be a worse deal, since their advantage over the discount is smaller. Thus, the server computer 14 relaxes the buying pressures or demands for bonds, which should result in additional sell orders, or at least slow the buying of bonds, thus decreasing their prices as they trade in the market. Likewise, stocks seem less attractive, since traders could make more money by keeping cash in their accounts and getting interest on it.

Block 222 is a decision block that represents the server computer 14 determining whether it received a request to revise the derivative list. If so, block 224 represents the server computer 14 executing a listing program. The server computer 14 determines whether the list of derivatives trading in the system should be revised. The list could be revised to reflect new derivative offerings, expired derivatives, and delisted derivatives.

When a new derivative is offered, the price is based on the derivative's potential value. For example, for a new stock offering, which represents a movie on the Hollywood Stock Exchange, the initial price of the stock could be based on the movie's potential box office revenue. For a bond offering, which represents talent on the Hollywood Bond Exchange, the price of the bond could be based on the Hollywood Reporter's Star Power Index. A bond representing a talent with a low Star Power Index of 15 would be issued with a higher yield than a bond representing a talent with a high Star Power Index rating.

A warrant with a strike price is attached to the new derivative when it is offered. When the derivative and warrant are first issued, the warrant is of no value until the strike price is reached. For a stock, the strike price could be reached after the movie has grossed a certain level of revenue. When a derivative is delisted from the exchange, a stock due to the movie ending its production run or a talent due to retirement or death, for example, the warrants are called and the traders are paid the value of the warrants, thus providing off-balance sheet financing for studios.

With reference to FIG. 3, a flowchart illustrating the logic of the pricing/trading program of the present invention is shown. Block 300 represents the server computer 14 retrieving the buy and sell orders that have accumulated in the queue during the period since the prior sweep pricing cycle. Block 302 represents the server computer 14 matching the buy orders with the sell orders, although it is likely than an identical number of buy and sell orders would not have accumulated in the queue during the period. Block 304 represents the server computer 14 executing the generate market price program described in FIG. 4 to determine the market price for the derivative financial instruments. After the market price is determined, block 306 represents the server computer 14 updating the traders' portfolios to reflect the buy and sell orders in the queue being processed at the market price. Block 308 represents the end of the pricing/trading program.

With reference to FIG. 4, a flowchart illustrating the logic of the generate market price program of the present invention is shown. One purpose of the generate market price logic is to generate a market price for a derivative financial instrument that reflects the demand or lack of demand for the derivative financial instrument in the market. Block 400 represents the server computer 14 measuring the imbalance between the buy and sell orders during the period since the prior sweep pricing cycle. Block 402 represents the server computer 14 determining the price movement of a derivative financial instrument caused by the imbalance in buy and sell orders. Block 404 represents the server computer 14 executing a virtual specialist program as described in FIG. 5 to provide stability and liquidity to the market. Block 406 represents the server computer 14 executing the stop trade program, as described in FIG. 6, to stop trading in a derivative financial instrument if the projected price movement is excessive during the trading day and threatens the integrity of the market for that instrument. Block 408 represents the server computer 14 setting the market price, which becomes the price the pricing/trading program uses to update the traders' portfolios. Block 410 represents the end of the generate market price program.

In measuring the imbalance between buy and sell orders, as represented by block 400, the absolute difference between the number of sells and the number of buys is defined as the net movement in sweep (NMS). A sweep increment variable (SIV) is defined as the increase or decrease in price caused by an incremental imbalance in the number of buy orders and sell orders. A lot movement variable (LMV) represents the incremental lot size that will result in a price increase or decrease of one SIV. The projected price movement (PM) can be expressed as: PM=(NMS/LMV)*SIV.

For example, with 42,000 buy orders and 30,000 sell orders for a particular stock, the NMS=(42,000−30,000)=12,000. With SIV=$0.25 and LMV=5000, the price movement of the particular stock will be (12,000/5,000)*0.25=$0.50. Thus, the market price of the particular stock will be $0.50 greater than the last trading price.

With such pricing scheme, there is the potential for great volatility in the price of a derivative financial instrument and the eventual loss of investor confidence in the market mechanism. In exchanges such as the Hollywood Stock Exchange, it would be possible for one or more individuals to pursue trading strategies that would purposely cause drastic price fluctuations.

In order to encourage growth and stability in the capital market regulated by the trading system of the present invention, a virtual specialist program is executed by the server computer, as represented by block 404 in FIG. 4. In executing the virtual specialist program, the server computer 14 regulates the trading by actively trading in the market out of a virtual specialist portfolio (VSP). In one embodiment of the present invention, the virtual specialist program portfolio initially contains half of all the issued shares of each derivative financial instrument.

Figure 5:
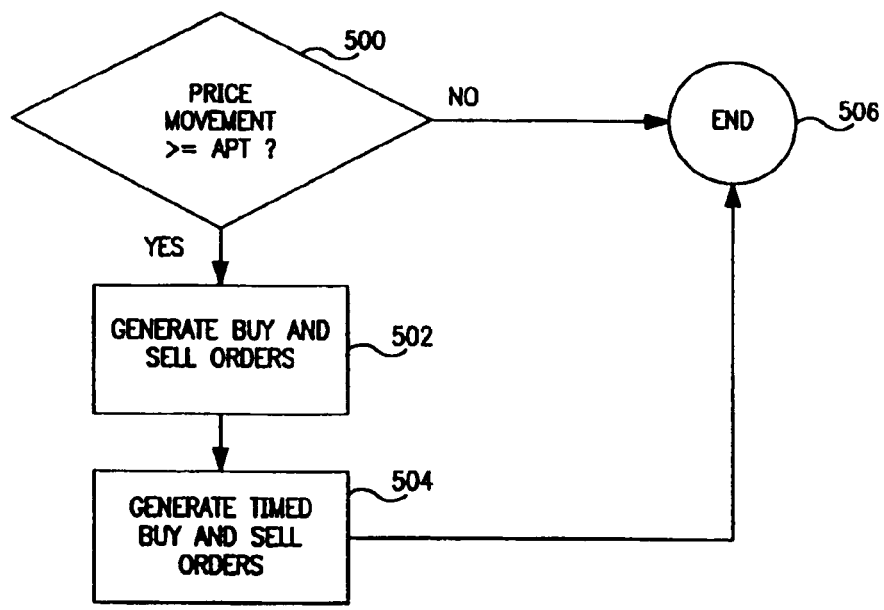
FIG. 5 shows a flow diagram illustrating the logic of the virtual specialist program of the first embodiment of the present invention.

With reference to FIG. 5, a flow diagram illustrating the logic of the virtual specialist program of the present invention is shown. Block 500 is a decision block that represents the server computer 14 determining whether the price movement during the sweep pricing cycle is greater or equal to an adjusted price movement threshold (APT). The APT is a constant in the memory of the server computer 14. If the APT is greater than the price movement, then the server computer 14 does not trade in the market. If the price movement is greater than or equal to the APT, then the server computer 14 trades out of a virtual specialist program portfolio. The level of trading by the server computer 14 is determined by the amount that the price movement exceeded the APT. The greater the price movement, the more shares the server computer 14 trades to offset the price movement.

In an exemplary embodiment of the present invention, the ATP=1.25 and the server computer 14 performs the following steps: if PM=APT then the server computer 14 matches 10% of unmatched shares; if PM=APT+0.25 then the server computer 14 matches 20% of unmatched shares; if PM=APT+0.50 then the server computer 14 matches 30% of unmatched shares; if PM=APT+0.75 then the server computer 14 matches 40% of unmatched shares; if PM=APT+1.0 then the server computer 14 matches 50% of unmatched shares; if PM=APT+1.25 then the server computer 14 matches 60% of unmatched shares; if PM=APT+1.50 then the server computer 14 matches 70% of unmatched shares; if PM=APT+1.75 then the server computer 14 matches 80% of unmatched shares.

Block 502 represents the server computer 14 generating a buy or a sell order to offset the price movement. The buy or sell order generated by the server computer 14 is placed in the queue with the trader buy and sell orders to be processed during the next sweep cycle.

In one embodiment of the present invention, since the virtual specialist program portfolio initially includes half of all the securities traded, the server computer 14 could eventually deplete the virtual specialist program portfolio or cause the virtual specialist program portfolio to own all the shares of a stock. In order to maintain a balanced virtual specialist program portfolio, and provide some liquidity to the market, the server computer 14 generates additional buy and sell orders to offset orders generated in response to the price movement exceeding the APT. Block 504 represents the server computer 14 generating timed buy and sell orders. In one embodiment of the invention, the server computer 14 assesses each stock and each bond in the virtual specialist program portfolio. The server computer 14 determines the deficit or surplus in the item, and then places $1/288^{th}$ of the deficit as a "timed recovery order" into each successive 15 minute segment for the next 3 days. When the pricing/trading program 255 matches buy and sell orders as represented by block 320, the pricing/trading program 255 includes any "timed recovery orders" outstanding for the last 3 days in the sweep. These orders are matched with the traders' buy and sell orders. Block 506 represents the end of the virtual specialist program.

Figure 6:
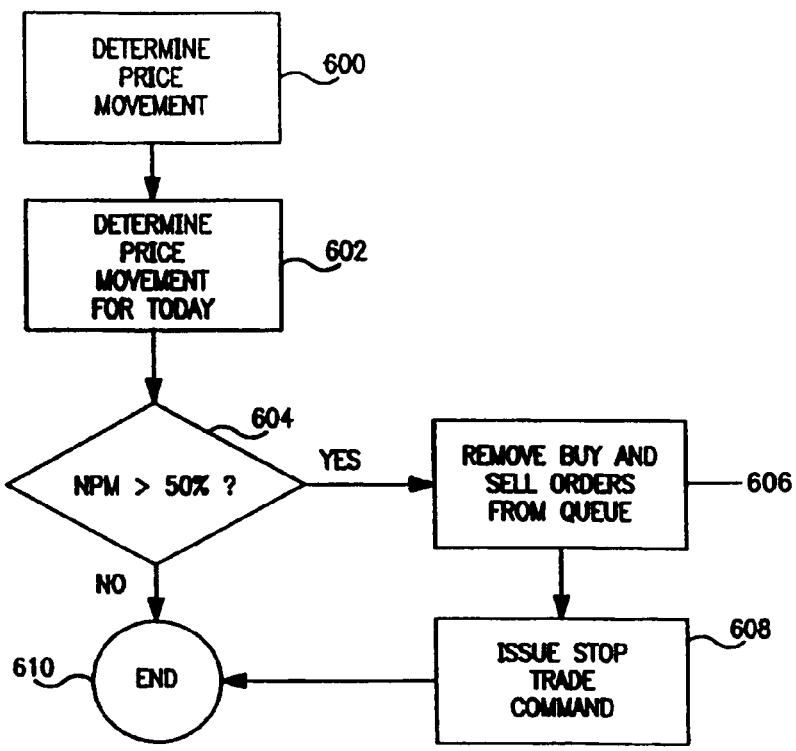
FIG. 6 shows a flow diagram illustrating the logic of the stop trading program of the first embodiment of the present invention.

FIG. 6 is a flow diagram illustrating the logic of the stop trading program of the present invention. Block 600 represents the server computer 14 determining the price movement of a stock caused by the imbalance in buy and sell orders. Block 602 represents the server computer 14 measuring the price movement on the day, not just during the sweep cycle period. Block 604 is a decision block that represents the server computer 14 determining whether the net price movement (NPM) within one "trading day" (i.e., midnight-midnight) is greater than 50% up or down. As represented by block 606, the buy and sell orders are removed from the queue if the net price movement is greater than 50% for a stock trading above $20. At that point, the trading in that issue is stopped within the 15 minute period until further notice. All orders (buy and sell) for that stock during this sweep are unfilled. The trading has stopped due to "excessive order imbalance".

For example, let it be assumed that the Last Trading Price (LTP) for "Rambo-17" is $67 (+7.5 on-the-day). During one 15-minute sweep pricing cycle, the server computer 24 receives buy orders for 655,000 shares of "Rambo-17". In addition, the server computer 14 receives sell orders for 35,000 shares of "Rambo-17" during the same sweep pricing cycle. The server computer 14 evaluates the price movement for the sweep pricing cycle, and tests it to see if the net projected price movement "on-the-day" is greater than 50%. If it would be greater than 50%, it stops trading in that instrument only. In this example, there is a net order-imbalance of 620,000 shares, which would create an up movement in price of (+620,000/5000)*$0.25=+$31.00. Since the total movement on the day would be the $7.50 so far plus the additional $31.00, the net projected price movement on the day would be $31.00+$7.50=$38.50. If the opening price that day was $59.50, the percentage projected price movement for the day is $38.50/$59.50=64%. Since the projected net price movement would be greater than 50%, the trading is stopped for that instrument. If the projected price movement was less than 50%, the price of the instrument would be adjusted accordingly and trade in that stock continued. Block 608 represents the STOP TRADE order that issues regarding the particular stock. Traders who issued a buy or sell order for the stock are notified that the order has not been filled due to excessive order imbalance during the trading day. Finally, block 610 represents the end of the stop trading program.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method, comprising:
   setting, using a computing device, an initial price for a derivative financial instrument that represents a movie in an entertainment industry, in which setting the initial price comprises:
      setting the initial price for the derivative financial instrument based at least in part on a potential box office revenue for the movie;
   receiving via a remote device a first order to buy the derivative financial instrument that represents the movie in the entertainment industry, the derivative financial instrument comprising a stock for trading over a network;
   receiving via the remote device a second order to sell the derivative financial instrument;
   setting, using the computing device, a market price for the derivative financial instrument based at least in part on the first order and the second order, in which the computing device and the remote device are in communication; and
   executing a trade of the derivative financial instrument at the set market price.

2. The method of claim 1, in which the network comprises the Internet.

3. The method of claim 1, in which the set market price is presented by electronic currency.

4. The method of claim 3, in which the electronic currency comprises actual dollars.

5. The method of claim 3, in which the electronic currency comprises virtual currency.

6. The method of claim 5, in which the virtual currency comprises Hollywood dollars.

7. The method of claim 1, further comprising:
   determining, using the computing device, a net price movement of the market price;
   stopping, using the computing device, trading of the derivative financial instrument based at least in part on the net price movement.

8. The method of claim 1, further comprising:
   offering the derivative financial instrument at the initial price.

9. An apparatus, comprising:
   a processor; and
   a memory, in which the memory stores instructions which, when executed by the processor, direct the processor to:
      set an initial price for a derivative financial instrument that represents a movie in an entertainment industry, in which setting the initial price comprises:
         setting the initial price for the derivative financial instrument based at least in part on a potential box office revenue for the movie;
      receive via a remote device a first order to buy the derivative financial instrument that represents the movie in the entertainment industry, the derivative financial instrument comprising a stock for trading over a network;
      receive via the remote device a second order to sell the derivative financial instrument;
      set a market price for the derivative financial instrument based at least in part on the first order and the second order, in which the computing device and the remote device are in communication; and
      execute a trade of the derivative financial instrument at the set market price.

10. The apparatus of claim 9, in which the network comprises the Internet.

11. The apparatus of claim 9, in which the set market price is presented by electronic currency.

12. The apparatus of claim 11, in which the electronic currency comprises actual dollars.

13. The apparatus of claim 11, in which the electronic currency comprises virtual currency.

14. The apparatus of claim 9, in which the memory further stores instructions which, when executed by the processor, direct the processor to:
   determine a net price movement of the market price;
   stop trading of the derivative financial instrument based at least in part on the net price movement.

15. The apparatus of claim 9, in which the memory further stores instructions which, when executed by the processor, direct the processor to:
   offer the derivative financial instrument at the initial price.

16. An article of manufacture, comprising:
   a non-transitory tangible storage medium, in which the storage medium stores instructions which, when executed by a processor, direct the processor to:
      set an initial price for a derivative financial instrument that represents a movie in an entertainment industry, in which setting the initial price comprises:
         setting the initial price for the derivative financial instrument based at least in part on a potential box office revenue for the movie;
      receive via a remote device a first order to buy the derivative financial instrument that represents the movie in the entertainment industry, the derivative financial instrument comprising a stock for trading over a network;
      receive via the remote device a second order to sell the derivative financial instrument;
      set a market price for the derivative financial instrument based at least in part on the first order and the second order, in which the computing device and the remote device are in communication; and
      execute a trade of the derivative financial instrument at the set market price.

17. The article of manufacture of claim 16, in which the network comprises the Internet.

18. The article of manufacture of claim 16, in which the set market price is presented by electronic currency.

19. The article of manufacture of claim 18, in which the electronic currency comprises actual dollars.

20. The article of manufacture of claim 18, in which the electronic currency comprises virtual currency.

21. The article of manufacture of claim 16, in which the storage medium further stores instructions which, when executed by the processor, direct the processor to:

determine a net price movement of the market price;
stop trading of the derivative financial instrument based at least in part on the net price movement.

22. The article of manufacture of claim 16, in which the storage medium further stores instructions which, when executed by the processor, direct the processor to:
offer the derivative financial instrument at the initial price.

23. A method, comprising:
setting, using a computing device, an initial price for a derivative financial instrument that represents a movie talent in an entertainment industry, in which setting the initial price comprises:
setting the initial price for the derivative financial instrument based at least in part on a popularity rating for the movie talent in the entertainment industry;
receiving via a remote device a first order to buy the derivative financial instrument that represents the movie talent in the entertainment industry, the derivative financial instrument comprising a bond for trading over a network;
receiving via the remote device a second order to sell the derivative financial instrument;
setting, using the computing device, a market price for the derivative financial instrument based at least in part on the first order and the second order, in which the computing device and the remote device are in communication; and
executing a trade of the derivative financial instrument at the set market price.

24. The method of claim 23, in which the network comprises the Internet.

25. The method of claim 23, in which the set market price is presented by electronic currency.

26. The method of claim 25, in which the electronic currency comprises actual dollars.

27. The method of claim 25, in which the electronic currency comprises virtual currency.

28. The method of claim 27, in which the virtual currency comprises Hollywood dollars.

29. The method of claim 23, further comprising:
determining, using the computing device, a net price movement of the market price;
stopping, using the computing device, trading of the derivative financial instrument based at least in part on the net price movement.

30. The method of claim 23, further comprising:
offering the derivative financial instrument at the initial price.

31. The method of claim 30, in which offering the derivative financial instrument at the initial price comprises:
issuing the bond with a higher yield than another bond that represents another movie talent, in which the popularity rating for the movie talent is lower than a popularity rating for the another movie talent.

32. An apparatus, comprising:
a processor; and
a memory, in which the memory stores instructions which, when executed by the processor, direct the processor to:
set an initial price for a derivative financial instrument that represents a movie talent in an entertainment industry, in which setting the initial price comprises:
setting the initial price for the derivative financial instrument based at least in part on a popularity rating for the movie talent in the entertainment industry;
receive via a remote device a first order to buy the derivative financial instrument that represents the movie talent in the entertainment industry, the derivative financial instrument comprising a bond for trading over a network;
receive via the remote device a second order to sell the derivative financial instrument;
set a market price for the derivative financial instrument based at least in part on the first order and the second order, in which the computing device and the remote device are in communication; and
execute a trade of the derivative financial instrument at the set market price.

33. The apparatus of claim 32, in which the network comprises the Internet.

34. The apparatus of claim 32, in which the set market price is presented by electronic currency.

35. The apparatus of claim 34, in which the electronic currency comprises actual dollars.

36. The apparatus of claim 34, in which the electronic currency comprises virtual currency.

37. The apparatus of claim 32, in which the memory further stores instructions which, when executed by the processor, direct the processor to:
determine a net price movement of the market price;
stop trading of the derivative financial instrument based at least in part on the net price movement.

38. The apparatus of claim 32, in which the memory further stores instructions which, when executed by the processor, direct the processor to:
offer the derivative financial instrument at the initial price.

39. The apparatus of claim 38, in which offering the derivative financial instrument at the initial price comprises:
issuing the bond with a higher yield than another bond that represents another movie talent, in which the popularity rating for the movie talent is lower than a popularity rating for the another movie talent.

40. An article of manufacture, comprising:
a non-transitory tangible storage medium, in which the storage medium stores instructions which, when executed by a processor, direct the processor to:
set an initial price for a derivative financial instrument that represents a movie talent in an entertainment industry, in which setting the initial price comprises:
setting the initial price for the derivative financial instrument based at least in part on a popularity rating for the movie talent in the entertainment industry;
receive via a remote device a first order to buy the derivative financial instrument that represents the movie talent in the entertainment industry, the derivative financial instrument comprising a bond for trading over a network;
receive via the remote device a second order to sell the derivative financial instrument;
set a market price for the derivative financial instrument based at least in part on the first order and the second order, in which the computing device and the remote device are in communication; and
execute a trade of the derivative financial instrument at the set market price.

41. The article of manufacture of claim 40, in which the network comprises the Internet.

42. The article of manufacture of claim 40, in which the set market price is presented by electronic currency.

43. The article of manufacture of claim 42, in which the electronic currency comprises actual dollars.

44. The article of manufacture of claim 42, in which the electronic currency comprises virtual currency.

45. The article of manufacture of claim 40, in which the memory further stores instructions which, when executed by the processor, direct the processor to:
- determine a net price movement of the market price;
- stop trading of the derivative financial instrument based at least in part on the net price movement.

46. The article of manufacture of claim 40, in which the memory further stores instructions which, when executed by the processor, direct the processor to:
- offer the derivative financial instrument at the initial price.

47. The article of manufacture of claim 46, in which offering the derivative financial instrument at the initial price comprises:
- issuing the bond with a higher yield than another bond that represents another movie talent, in which the popularity rating for the movie talent is lower than a popularity rating for the another movie talent.

* * * * *